US009560711B2

(12) United States Patent
Catalano et al.

(10) Patent No.: US 9,560,711 B2
(45) Date of Patent: Jan. 31, 2017

(54) METHOD AND DEVICE FOR REMOTE SENSING AND CONTROL OF LED LIGHTS

(71) Applicant: TerraLUX, Inc., Longmont, CO (US)

(72) Inventors: Anthony W. Catalano, Boulder, CO (US); Daniel J. Harrison, Nederland, CO (US); Steven S. Davis, Longmont, CO (US)

(73) Assignee: TerraLUX, Inc., Longmont, CO (US)

( * ) Notice: Subject to any disclaimer, the term of this patent is extended or adjusted under 35 U.S.C. 154(b) by 0 days.

(21) Appl. No.: 15/065,655

(22) Filed: Mar. 9, 2016

(65) Prior Publication Data
US 2016/0192450 A1    Jun. 30, 2016

Related U.S. Application Data

(63) Continuation of application No. 14/737,052, filed on Jun. 11, 2015, now Pat. No. 9,326,346, which is a
(Continued)

(51) Int. Cl.
*H05B 33/06* (2006.01)
*H05B 33/08* (2006.01)
*G01K 7/01* (2006.01)

(52) U.S. Cl.
CPC ............ *H05B 33/0848* (2013.01); *G01K 7/01* (2013.01); *H05B 33/089* (2013.01);
(Continued)

(58) Field of Classification Search
USPC ............ 315/112, 117, 185 R, 224, 291, 297, 307, 315/308, 309
See application file for complete search history.

(56) References Cited

U.S. PATENT DOCUMENTS

| 4,085,403 A | 4/1978 | Meier |
| 4,529,949 A | 7/1985 | De Wit et al. |

(Continued)

FOREIGN PATENT DOCUMENTS

| AU | 2010204851 A1 | 7/2011 |
| AU | 2010363633 A1 | 7/2012 |

(Continued)

OTHER PUBLICATIONS

O'Malley, Andrew, "Canadian Office Action re Application No. 2749472", Feb. 29, 2016 p. 5, Published in: CA.
(Continued)

*Primary Examiner* — Thai Pham
(74) *Attorney, Agent, or Firm* — Neugeboren O'Dowd PC

(57) ABSTRACT

A system and method of thermal management for an LED are provided. A method provided by the system includes (a) providing a forward drive current to power the LED, the forward drive current having a first LED operating current component; (b) detecting the first LED operating current component; (c) sensing a first thermal operating point of the LED; and (d) generating a temperature signal indicative of the first thermal operating point. The method also includes (e) determining a thermal operating range of the LED; (f) determining that the first thermal operating point of the LED is outside the thermal operating range of the LED; and (g) generating a first control setting configured to cause the LED to be driven at a second operating point, the second thermal operating point within the thermal operating range.

20 Claims, 19 Drawing Sheets

Related U.S. Application Data continuation-in-part of application No. 14/177,673, filed on Feb. 11, 2014, now Pat. No. 9,161,415, which is a continuation of application No. 13/718,366, filed on Dec. 18, 2012, now Pat. No. 8,686,666, which is a continuation of application No. 12/683,393, filed on Jan. 6, 2010, now Pat. No. 8,358,085, said application No. 14/737,052 is a continuation-in-part of application No. 12/948,591, filed on Nov. 17, 2010, and a continuation-in-part of application No. 12/948,589, filed on Nov. 17, 2010, and a continuation-in-part of application No. 12/948,586, filed on Nov. 17, 2010.

(60) Provisional application No. 61/144,408, filed on Jan. 13, 2009, provisional application No. 61/261,991, filed on Nov. 17, 2009.

(52) U.S. Cl.
CPC ..... *H05B 33/0854* (2013.01); *H05B 33/0893* (2013.01); *G01K 2217/00* (2013.01)

(56) References Cited

U.S. PATENT DOCUMENTS

| | | |
|---|---|---|
| 4,633,161 A | 12/1986 | Callahan |
| 5,334,916 A | 8/1994 | Noguchi |
| 5,401,099 A | 3/1995 | Nishizawa et al. |
| 5,485,576 A | 1/1996 | Fee et al. |
| 5,506,490 A | 4/1996 | DeMuro |
| 5,546,041 A | 8/1996 | Szajda |
| 5,606,510 A | 2/1997 | Glaser et al. |
| 5,661,645 A | 8/1997 | Hochstein |
| 5,691,605 A | 11/1997 | Xia et al. |
| 5,781,040 A | 7/1998 | Myers |
| 5,783,909 A | 7/1998 | Hockstein |
| 5,925,990 A | 7/1999 | Crouse et al. |
| 5,942,860 A | 8/1999 | Huynh |
| 6,069,457 A | 5/2000 | Bogdan |
| 6,153,985 A | 11/2000 | Grossman |
| 6,225,759 B1 | 5/2001 | Bogdan et al. |
| 6,313,589 B1 | 11/2001 | Kobayashi et al. |
| 6,332,710 B1 | 12/2001 | Aslan et al. |
| 6,351,079 B1 | 2/2002 | Willis |
| 6,382,812 B1 | 5/2002 | Hsu |
| 6,429,598 B1 | 8/2002 | Haley |
| 6,459,257 B1 | 10/2002 | Kock |
| 6,515,437 B1 | 2/2003 | Zinkler et al. |
| 6,693,394 B1 | 2/2004 | Guo et al. |
| 6,713,974 B2 | 3/2004 | Patchornik et al. |
| 6,762,629 B2 | 7/2004 | Tam et al. |
| 6,842,668 B2 | 1/2005 | Carson et al. |
| 6,870,325 B2 | 3/2005 | Bushell et al. |
| 6,930,737 B2 | 8/2005 | Weindorf et al. |
| 7,029,145 B2 | 4/2006 | Frederick |
| 7,034,507 B2 | 4/2006 | Lovett |
| 7,049,765 B1 | 5/2006 | Tremaine |
| 7,119,498 B2 | 10/2006 | Baldwin et al. |
| 7,126,290 B2 | 10/2006 | Elliott |
| 7,150,561 B1 | 12/2006 | D'Aquino et al. |
| 7,186,000 B2 | 3/2007 | Lebens et al. |
| 7,196,481 B2 | 3/2007 | Bushell et al. |
| 7,204,638 B2 | 4/2007 | Hsu |
| 7,233,258 B1 | 6/2007 | Gelinas |
| 7,242,150 B2 | 7/2007 | DeJonge et al. |
| 7,245,089 B2 | 7/2007 | Yang |
| 7,245,090 B2 | 7/2007 | Yang |
| 7,262,559 B2 | 8/2007 | Tripathi et al. |
| 7,286,123 B2 | 10/2007 | Yang |
| 7,322,718 B2 | 1/2008 | Setomoto et al. |
| 7,330,002 B2 | 2/2008 | Joung |
| 7,336,434 B2 | 2/2008 | Lille et al. |
| 7,344,279 B2 | 3/2008 | Mueller et al. |
| 7,358,679 B2 | 4/2008 | Lys et al. |
| 7,423,750 B2 | 9/2008 | Hoshizaki et al. |
| 7,429,129 B2 | 9/2008 | St. Pierre et al. |
| 7,486,030 B1 | 2/2009 | Biggs |
| 7,492,108 B2 | 2/2009 | Garcia et al. |
| 7,504,781 B2 | 3/2009 | Wendt et al. |
| 7,504,783 B2 | 3/2009 | Zarr |
| 7,507,001 B2 | 3/2009 | Kit |
| 7,546,473 B2 | 6/2009 | Newman |
| 7,556,423 B2 | 7/2009 | Caliboso |
| 7,605,550 B2 | 10/2009 | Ferentz et al. |
| 7,612,506 B1 | 11/2009 | Yang et al. |
| 7,626,346 B2 | 12/2009 | Scilla |
| 7,628,507 B2 | 12/2009 | Allen et al. |
| 7,633,326 B2 | 12/2009 | Okajima |
| 7,635,957 B2 | 12/2009 | Tripathi et al. |
| 7,656,307 B2 | 2/2010 | Yatsuda et al. |
| 7,656,371 B2 | 2/2010 | Shimizu et al. |
| 7,728,401 B2 | 6/2010 | Takatori |
| 7,755,513 B2 | 7/2010 | Wang et al. |
| 7,777,430 B2 | 8/2010 | Catalano et al. |
| 7,791,326 B2 | 9/2010 | Dahlman et al. |
| 7,792,167 B2 | 9/2010 | Kanesaka |
| 7,800,316 B2 | 9/2010 | Haug |
| 7,800,567 B2 | 9/2010 | Fujino |
| 7,812,551 B2 | 10/2010 | Hite et al. |
| 7,817,009 B2 | 10/2010 | Wang et al. |
| 7,846,030 B2 | 12/2010 | Cornay et al. |
| 7,888,623 B2 | 2/2011 | Kawashima et al. |
| 7,888,877 B2 | 2/2011 | Tsai et al. |
| 7,888,942 B2 | 2/2011 | Chen et al. |
| 7,892,870 B2 | 2/2011 | Shi |
| 7,911,156 B2 | 3/2011 | Cottongim et al. |
| 7,911,438 B2 | 3/2011 | Okazaki |
| 7,947,947 B2 | 5/2011 | Ackermann et al. |
| 7,948,190 B2 | 5/2011 | Grajcar |
| 7,948,398 B2 | 5/2011 | Miller |
| 7,986,112 B2 | 7/2011 | West |
| 7,990,077 B2 | 8/2011 | Yu et al. |
| 7,994,725 B2 | 8/2011 | Bouchard |
| 8,476,847 B2 | 7/2013 | Riesebosch |
| 8,686,666 B2 | 4/2014 | Catalano et al. |
| 8,791,655 B2 | 7/2014 | Sadwick et al. |
| 8,896,231 B2 | 11/2014 | Brandt |
| 2002/0048177 A1 | 4/2002 | Rahm et al. |
| 2003/0015973 A1 | 1/2003 | Ovens et al. |
| 2003/0052658 A1 | 3/2003 | Baretich et al. |
| 2003/0123521 A1 | 7/2003 | Luoma |
| 2004/0032221 A1 | 2/2004 | Bushell et al. |
| 2004/0164688 A1 | 8/2004 | Van Tichelen et al. |
| 2005/0057184 A1 | 3/2005 | Kaneko et al. |
| 2005/0057187 A1 | 3/2005 | Catalano |
| 2005/0062481 A1 | 3/2005 | Vaughn et al. |
| 2005/0237005 A1 | 10/2005 | Maxik |
| 2006/0038661 A1 | 2/2006 | Reinhold et al. |
| 2006/0057184 A1 | 3/2006 | Nycz et al. |
| 2006/0119288 A1 | 6/2006 | Ayala et al. |
| 2006/0125773 A1 | 6/2006 | Ichikawa et al. |
| 2006/0152204 A1 | 7/2006 | Maksimovic et al. |
| 2006/0214876 A1 | 9/2006 | Jendbro et al. |
| 2006/0237636 A1 | 10/2006 | Lyons et al. |
| 2006/0238169 A1 | 10/2006 | Baker |
| 2006/0273741 A1 | 12/2006 | Stalker |
| 2007/0040512 A1 | 2/2007 | Jungwirth et al. |
| 2007/0040518 A1 | 2/2007 | Young |
| 2007/0057902 A1 | 3/2007 | Joung |
| 2007/0069656 A1 | 3/2007 | Huang |
| 2007/0121324 A1 | 5/2007 | Nakano |
| 2007/0273290 A1 | 11/2007 | Ashdown et al. |
| 2007/0285031 A1 | 12/2007 | Shteynberg et al. |
| 2007/0291483 A1 | 12/2007 | Lys |
| 2008/0018261 A1 | 1/2008 | Kastner |
| 2008/0062070 A1 | 3/2008 | De Oto et al. |
| 2008/0084169 A1 | 4/2008 | Wendt et al. |
| 2008/0088557 A1 | 4/2008 | Choi |
| 2008/0111505 A1 | 5/2008 | Wang |
| 2008/0122422 A1 | 5/2008 | Zhang et al. |
| 2008/0136334 A1 | 6/2008 | Robinson et al. |
| 2008/0150442 A1 | 6/2008 | Feldtkeller |
| 2008/0151965 A1 | 6/2008 | Kim |

(56) References Cited

U.S. PATENT DOCUMENTS

| | | |
|---|---|---|
| 2008/0180414 A1 | 7/2008 | Fung et al. |
| 2008/0198613 A1 | 8/2008 | Cruickshank |
| 2008/0203992 A1 | 8/2008 | Qahouq |
| 2008/0204884 A1 | 8/2008 | Jang |
| 2008/0215279 A1 | 9/2008 | Salsbury et al. |
| 2008/0224633 A1 | 9/2008 | Melanson et al. |
| 2008/0231198 A1 | 9/2008 | Zarr |
| 2008/0236340 A1 | 10/2008 | Weatherly et al. |
| 2008/0258636 A1 | 10/2008 | Shih et al. |
| 2008/0287742 A1 | 11/2008 | St. George et al. |
| 2008/0319690 A1 | 12/2008 | Meadows et al. |
| 2009/0021178 A1 | 1/2009 | Furukawa et al. |
| 2009/0021955 A1 | 1/2009 | Kuang et al. |
| 2009/0033612 A1 | 2/2009 | Roberts et al. |
| 2009/0079362 A1 | 3/2009 | Shteynberg et al. |
| 2009/0097244 A1 | 4/2009 | Lan et al. |
| 2009/0146584 A1 | 6/2009 | Ye et al. |
| 2009/0154525 A1 | 6/2009 | Dai et al. |
| 2009/0167203 A1 | 7/2009 | Dahlman et al. |
| 2009/0179574 A1 | 7/2009 | Chang |
| 2009/0179848 A1 | 7/2009 | Schmidt et al. |
| 2009/0212736 A1 | 8/2009 | Baarman et al. |
| 2009/0251059 A1 | 10/2009 | Veltman |
| 2009/0267523 A1 | 10/2009 | Phillips |
| 2009/0289965 A1 | 11/2009 | Kurokawa et al. |
| 2009/0302783 A1 | 12/2009 | Wang et al. |
| 2009/0306912 A1 | 12/2009 | Chen et al. |
| 2010/0007588 A1 | 1/2010 | Zygmunt et al. |
| 2010/0033095 A1 | 2/2010 | Sadwich |
| 2010/0033112 A1 | 2/2010 | Yen |
| 2010/0039049 A1 | 2/2010 | Hoffman |
| 2010/0066270 A1 | 3/2010 | Yang et al. |
| 2010/0118057 A1 | 5/2010 | Atkins et al. |
| 2010/0134020 A1 | 6/2010 | Peng et al. |
| 2010/0157583 A1 | 6/2010 | Nakajima |
| 2010/0176734 A1 | 7/2010 | Haubmann |
| 2010/0176746 A1 | 7/2010 | Catalano et al. |
| 2010/0194368 A1 | 8/2010 | Taylor et al. |
| 2010/0203465 A1 | 8/2010 | Bria et al. |
| 2010/0225170 A1 | 9/2010 | Hjort et al. |
| 2010/0237787 A1 | 9/2010 | Vogler et al. |
| 2010/0244701 A1 | 9/2010 | Chen et al. |
| 2010/0259191 A1 | 10/2010 | Ghanem et al. |
| 2010/0264795 A1 | 10/2010 | Miao |
| 2010/0277077 A1 | 11/2010 | Pong et al. |
| 2010/0283397 A1 | 11/2010 | Chen et al. |
| 2010/0295474 A1 | 11/2010 | Chemel et al. |
| 2010/0295688 A1 | 11/2010 | Wu et al. |
| 2010/0301751 A1 | 12/2010 | Chobot et al. |
| 2010/0320939 A1 | 12/2010 | Lai |
| 2010/0327872 A1 | 12/2010 | Chen et al. |
| 2011/0001438 A1 | 1/2011 | Chemel et al. |
| 2011/0019430 A1 | 1/2011 | Wilkinson et al. |
| 2011/0031903 A1 | 2/2011 | Nguyen Hoang et al. |
| 2011/0038715 A1 | 2/2011 | Frank et al. |
| 2011/0043120 A1 | 2/2011 | Panagotacos et al. |
| 2011/0062895 A1 | 3/2011 | Ji |
| 2011/0068715 A1 | 3/2011 | Hum |
| 2011/0080099 A1 | 4/2011 | Teng et al. |
| 2011/0089852 A1 | 4/2011 | Segan |
| 2011/0109231 A1 | 5/2011 | Shiu et al. |
| 2011/0115396 A1 | 5/2011 | Horvath et al. |
| 2011/0115399 A1 | 5/2011 | Sadwick et al. |
| 2011/0115400 A1 | 5/2011 | Harrison et al. |
| 2011/0115645 A1 | 5/2011 | Hall et al. |
| 2011/0121744 A1 | 5/2011 | Salvestrini et al. |
| 2011/0121751 A1 | 5/2011 | Harrison et al. |
| 2011/0121760 A1 | 5/2011 | Harrison et al. |
| 2011/0147466 A1 | 6/2011 | Kang et al. |
| 2011/0150028 A1 | 6/2011 | Nguyen Hoang et al. |
| 2011/0156593 A1 | 6/2011 | DeGreef et al. |
| 2011/0157238 A1 | 6/2011 | Lin et al. |
| 2011/0163696 A1 | 7/2011 | Huang et al. |
| 2011/0199013 A1 | 8/2011 | Cottrell |
| 2012/0001548 A1 | 1/2012 | Recker et al. |
| 2012/0068618 A1 | 3/2012 | Koski et al. | |
| 2012/0268040 A1* | 10/2012 | Riesebosch | H05B 33/089 315/309 |
| 2012/0299481 A1* | 11/2012 | Stevens | H05B 33/089 315/117 |
| 2012/0326623 A1 | 12/2012 | Fatt et al. | |
| 2013/0082610 A1* | 4/2013 | Bradford | H05B 33/0893 315/185 R |
| 2013/0182744 A1 | 7/2013 | Catalano et al. | |
| 2014/0217896 A1 | 8/2014 | Catalano et al. | |
| 2014/0306609 A1* | 10/2014 | Kang | H05B 33/086 315/117 |
| 2014/0368130 A1 | 12/2014 | Catalano et al. | |

FOREIGN PATENT DOCUMENTS

| | | |
|---|---|---|
| CN | 2924996 Y | 7/2007 |
| CN | 101049050 A | 10/2007 |
| CN | 103025337 A | 4/2013 |
| CN | 104254178 A | 12/2014 |
| CN | 104302039 A | 1/2015 |
| DE | 19725710 A1 | 1/1998 |
| EP | 0492117 A2 | 7/1992 |
| EP | 0657697 A1 | 6/1995 |
| EP | 0923274 A2 | 6/1999 |
| EP | 1271799 A1 | 1/2003 |
| EP | 1313353 A1 | 5/2003 |
| EP | 1701589 A1 | 9/2006 |
| EP | 2073607 A1 | 6/2009 |
| EP | 2273851 A2 | 1/2011 |
| EP | 2501393 A2 | 9/2012 |
| GB | 2335334 A | 9/1999 |
| JP | 57133685 A | 8/1982 |
| JP | 6166564 A | 4/1986 |
| JP | 2003188415 A | 7/2003 |
| JP | 2003317979 A | 11/2003 |
| JP | 2004296205 A | 10/2004 |
| JP | 2005285528 A | 10/2005 |
| JP | 2007227155 A | 9/2007 |
| JP | 2008172999 A | 7/2008 |
| JP | 2008224136 A | 9/2008 |
| JP | 2009083590 A | 4/2009 |
| JP | 2013517613 A | 5/2013 |
| KR | 20000006665 A | 2/2000 |
| KR | 20060098345 A | 9/2006 |
| KR | 20070053818 A | 5/2007 |
| WO | 9010238 A2 | 9/1990 |
| WO | 9900650 A1 | 1/1999 |
| WO | 0017728 A2 | 3/2000 |
| WO | 2004075606 A1 | 9/2004 |
| WO | 2005081591 A1 | 9/2005 |
| WO | 2006043232 A1 | 4/2006 |
| WO | 2006058418 A1 | 6/2006 |
| WO | 2007147573 A1 | 12/2007 |
| WO | 2008096249 A2 | 8/2008 |
| WO | 2009055821 A1 | 4/2009 |
| WO | 2009064099 A2 | 5/2009 |
| WO | 2009079944 A1 | 7/2009 |
| WO | 2010137002 A1 | 12/2010 |
| WO | 2011044040 A1 | 4/2011 |
| WO | 2011051859 A1 | 5/2011 |
| WO | 2011056242 A1 | 5/2011 |
| WO | 2011114250 A1 | 9/2011 |
| WO | 2011137646 A1 | 11/2011 |
| WO | 2011145009 A1 | 11/2011 |
| WO | 2012007798 A2 | 1/2012 |
| WO | 2012087268 A2 | 6/2012 |
| WO | 2012162601 A1 | 11/2012 |
| WO | 2013090904 A1 | 6/2013 |

OTHER PUBLICATIONS

Liu, Huanling, "Chinese Office Action re Application No. 201410405888.7", Jan. 7, 2016, p. 11, Published in: China.

Wang, Richard Yong, "Response to Chinese Office Action re Application No. 201410405888.7", May 18, 2016, p. 7, Published in: CN.

He, Shi, "Chinese Office Action re Application No. 201410406262.8", Jan. 4, 2016, p. 19, Published in: CN.

(56) References Cited

OTHER PUBLICATIONS

Wang, Richard Yong, "Response to Chinese Office Action re Application No. 201410406262.8", May 17, 2016, p. 4, Published in: CN.
Boudet, Joachim, "Extended European Search Report re Application No. 16151307.2", May 19, 2016, p. 7, Published in: Germany.
Miyazaki, Koji, "Japanese Office Action re Application No. 2015016411", Jan. 5, 2016, p. 6, Published in: JP.
Yamamoto, Shusaku, "Response to Japanese Office Action re Application No. 201516411", Apr. 20, 2016, p. 29, Published in: JP.
Howell, Steven, "Australian Office Action re Application No. 2012258584", Feb. 18, 2015, p. 4, Published in: AU.
Howell, Steven, "Australian Office Action re Application No. 2012258584", May 20, 2014, p. 3, Published in: AU.
O'Malley, Andrew, "Canadian Office Action re Application No. 2835875", Mar. 19, 2015, p. 3, Published in: CA.
Yao, Yan, "Chinese Office Action re Application No. 2010800615881", Jun. 4, 2014, p. 4, Published in: CN.
Boudet, Joachim, "European Office Action re Application No. 10859616.4", Oct. 28, 2014, p. 4, Published in: EP.
Bagnera, Carlo, "Extended European Search Report re Application No. PCTUS2010020819", Nov. 29, 2013, p. 7, Published in: EP.
Johnson, Christine, "Office Action re U.S. Appl. No. 12/948,591", Jul. 29, 2013, p. 31, Published in: US.
Johnson, Christine, "Office Action re U.S. Appl. No. 12/948,589", Nov. 21, 2013, p. 15, Published in: US.
Johnson, Christine, "Office Action re U.S. Appl. No. 12/948,586", Nov. 27, 2013, p. 16, Published in: US.
Mishimagi, Hidehiro, "Japanese Office Action re Application No. 2012-549988", Jun. 22, 2015, p. 11, Published in: JP.
Mishimagi, Hidehiro, "Japanese Office Action re Application No. 2012549988", Oct. 2, 2014, p. 16, Published in: JP.
Pham, Thai, "Office Action re U.S. Appl. No. 14/177,673", Jan. 16, 2015, p. 56, Published in: US.
Johnson, Christine, "Office Action re U.S. Appl. No. 12/948,591", Jan. 17, 2013, p. 46, Published in: US.
Johnson, Christine, "Office Action re U.S. Appl. No. 12/948,589", Mar. 14, 2013, p. 47, Published in: US.
Johnson, Christine, "Office Action re U.S. Appl. No. 12/948,586", Mar. 15, 2013, p. 126, Published in: US.
Pham. Thai, "Office Action re U.S. Appl. No. 12/683,393", Mar. 20, 2012, p. 9, Published in: US.
Johnson, Christine, "Office Action re U.S. Appl. No. 12/948,591", Apr. 3, 2014, p. 32, Published in: US.
Pham, Thai, "Office Action re U.S. Appl. No. 12/683,393", May 22, 2012, p. 43, Published in: US.
Pham, Thai, "Office Action re U.S. Appl. No. 13/718,366", Jul. 25, 2013, p. 78, Published in: US.
Johnson, Christine, "Office Action re U.S. Appl. No. 12/948,586", Oct. 8, 2014, p. 54, Published in: US.
Johnson, Christine, "Office Action re U.S. Appl. No. 12/948,589", Oct. 30, 2014, p. 65, Published in: US.
Giffo-Schmitt, Beate, "International Preliminary Report on Patentability re Application No. PCTUS2010020819", Jan. 12, 2010, p. 6, Published in: SE.
Kim, Chang Gyun, "International Search Report and Written Opinion re Application No. PCTUS2010020819", Jan. 12, 2010, p. 8, Published in: KR.
Baharlou, Simin, "International Preliminary Report on Patentability re Application No. PCTUS2010057060", Nov. 17, 2010, p. 7, Published in: SE.
Boudet, Joachim, "International Search Report and Written Opinion re Application No. PCTUS2010057060", Nov. 23, 2012, p. 11, Published in: EP.
Lindner, Nora, "International Preliminary Report on Patentability re Application No. PCTUS2011051883", Mar. 19, 2013, p. 8, Published in: SE.
Ladiray, Olivier, "International Search Report and Written Opinion re Application No. PCTUS2011051883", Feb. 6, 2012, p. 11, Published in: EP.
Mohri, Mineko, "International Preliminary Report on Patentability re Application No. PCTUS2012039558", Nov. 26, 2013, p. 6, Published in: SE.
Albertsson, Gustav, "International Search Report and Written Opinion re Application No. PCTUS2012039558", Sep. 24, 2012, p. 8, Published in: EP.
Lindner, Nora, "International Preliminary Report on Patentability re Application No. PCTUS2012070126", Jun. 17, 2014, p. 7, Published in: SE.
Waters, Duncan, "International Search Report and Written Opinion re Application No. PCTUS2012070126", Jun. 6, 2013, p. 9, Published in: EP.
Pendergast, Patrick et al., "Thermal design considerations for high-power LED systems", "EE Times", Feb. 12, 2007, p. 7.
Russell, Steven J., "Respone to Office Action and Appeal re U.S. Appl. No. 12/948,589", Jan. 8, 2015, p. 5, Published in: US.
Russell, Steven J., "Response to Office Action re U.S. Appl. No. 12/948,586", Apr. 22, 2014, p. 21, Published in: US.
Currie, Matthew T., "Response to Office Action re U.S. Appl. No. 14/177,673", Apr. 13, 2015, p. 10, Published in: US.
Russell, Steven J., "Response to Office Action re U.S. Appl. No. 12/948,591", Apr. 17, 2013 , p. 10, Published in: US.
Currie, Matthew T., "Response to Office Action re U.S. Appl. No. 12/683,393", Apr. 18, 2012, p. 1, Published in: US.
Currie, Matthew T., "Response to Office Action re U.S. Appl. No. 12/683,393", Jul. 11, 2012, p. 16, Published in: US.
Russell, Steven J., "Response to Office Action re U.S. Appl. No. 12/948,589", Aug. 13, 2013, p. 14, Published in: US.
Russell, Steven J., "Response to Office Action re U.S. Appl. No. 12/948,586", Aug. 13, 2013, p. 15, Published in: US.
Currie, Matthew T., "Response to Office Action re U.S. Appl. No. 13/718,366", Oct. 23, 2013, p. 14, Published in: US.
Russell, Steven J., "Response to Office Action and Appeal re U.S. Appl. No. 12/948,591", Jul. 2, 2014, p. 7, Published in: US.
Russell, Steven J., "Response to Office Action and RCE re U.S. Appl. No. 12/948,589", Apr. 18, 2014, p. 22, Published in: US.
Russell, Steven J., "Response to Office Action and RCE re U.S. Appl. No. 12/948,591", Oct. 29, 2013, p. 16, Published in: US.
O'Malley, Andrew, "Canadian Office Action re Application No. 2749472", Feb. 29, 2016, p. 5, Published in: CA.
He, Shi, "Chinese Office Action re Application No. 201410406262.8", Aug. 1, 2016, p. 19 Published in: CN.

* cited by examiner

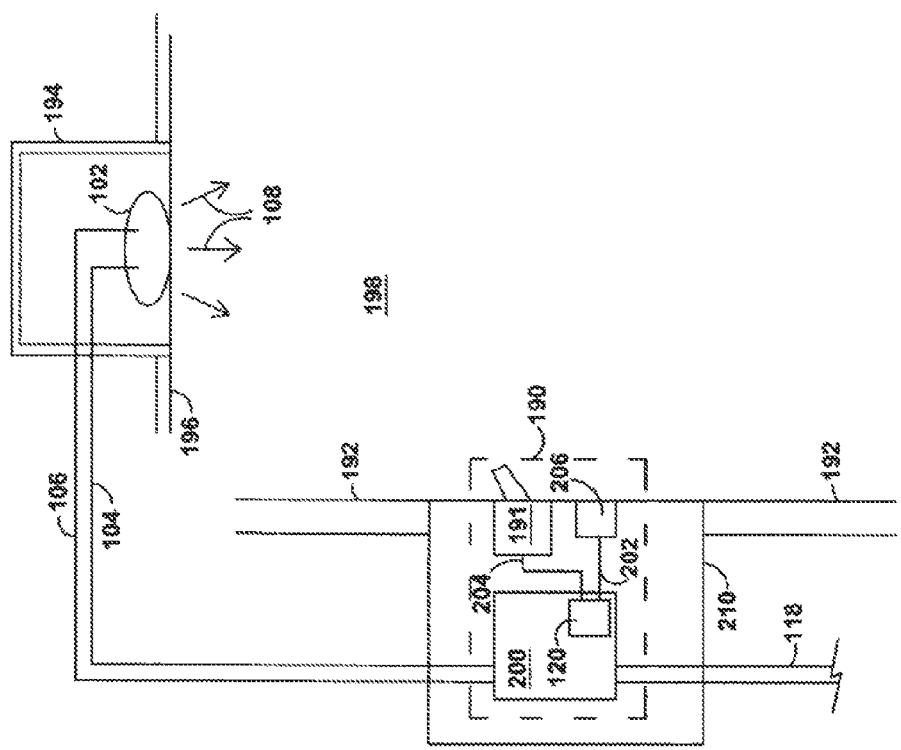

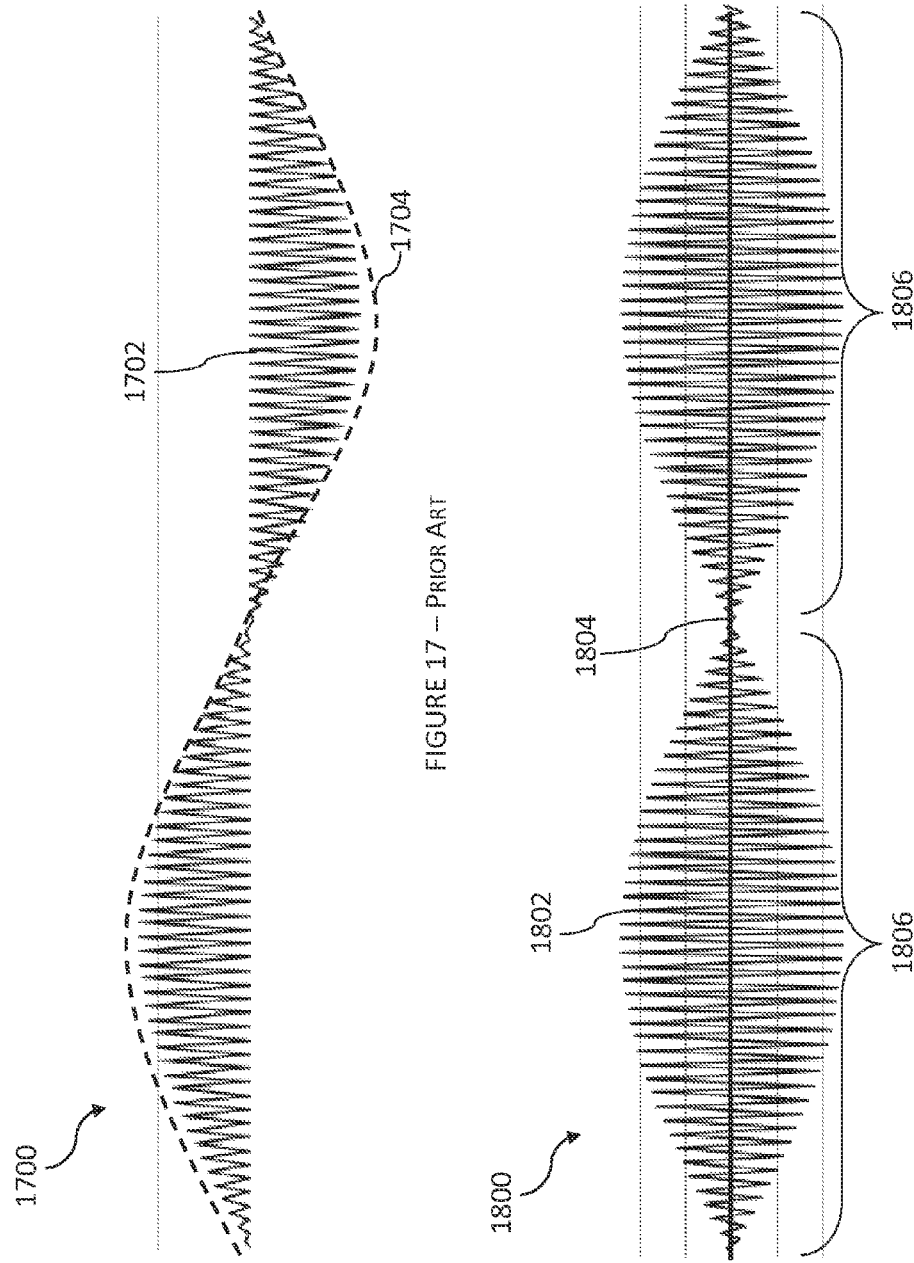

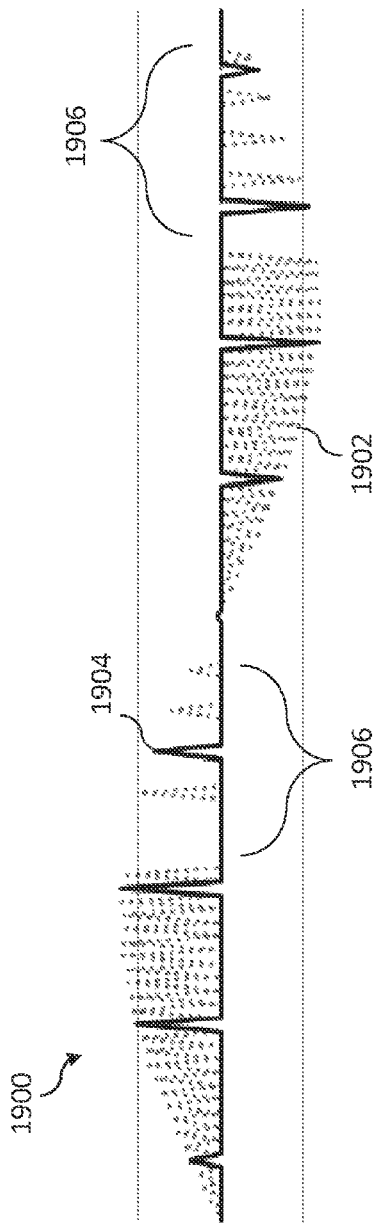
FIGURE 19 – PRIOR ART
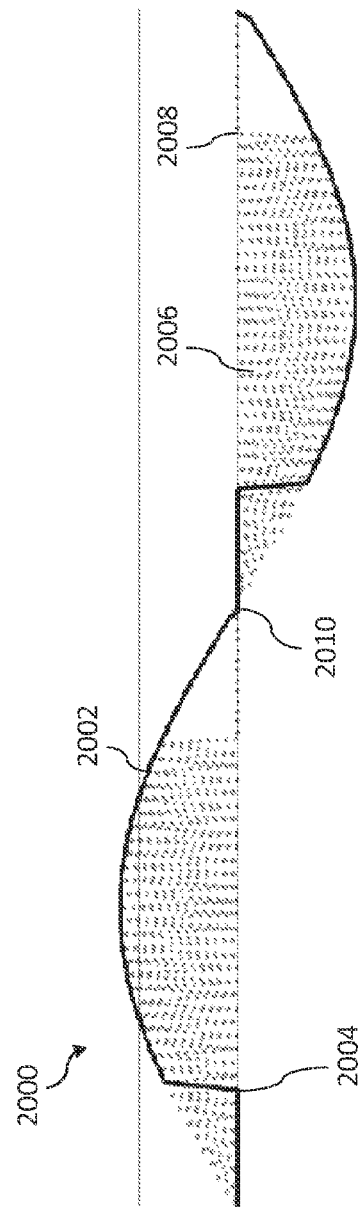
FIGURE 20 – PRIOR ART

METHOD AND DEVICE FOR REMOTE SENSING AND CONTROL OF LED LIGHTS

CROSS-REFERENCE TO RELATED APPLICATIONS

This application is a continuation of U.S. patent application Ser. No. 14/737,052 filed Jun. 11, 2015 and entitled "METHOD AND DEVICE FOR REMOTE SENSING AND CONTROL OF LED LIGHTS," which is a continuation-in-part of, and claims priority to and the benefit of, U.S. patent application Ser. No. 14/177,673, which was filed on Feb. 11, 2014, which is a continuation of U.S. patent application Ser. No. 13/718,366, filed on Dec. 18, 2012, which is a continuation of U.S. patent application Ser. No. 12/683,393, filed on Jan. 6, 2010, which claims priority to and the benefit of U.S. Provisional Application No. 61/144,408, filed on Jan. 13, 2009.

U.S. patent application Ser. No. 14/737,052 is also a continuation-in-part of, and claims priority to and the benefit of, U.S. application Ser. No. 12/948,591, which was filed on Nov. 17, 2010, and which claims priority to and the benefit of U.S. Provisional Patent Application No. 61/261,991, filed on Nov. 17, 2009. This application is also a continuation-in-part of, and claims priority to and the benefit of, U.S. patent application Ser. No. 12/948,589, which was filed on Nov. 17, 2010, and which claims priority to and the benefit of U.S. Provisional Patent Application No. 61/261,991, filed on Nov. 17, 2009.

U.S. patent application Ser. No. 14/737,052 is also a continuation-in-part of, and claims priority to and the benefit of, U.S. patent application Ser. No. 12/948,586, which was filed on Nov. 17, 2010, and which claims priority to and the benefit of U.S. Provisional Patent Application No. 61/261,991, filed on Nov. 17, 2009. The disclosure of each of these applications is hereby incorporated herein by reference in its entirety.

FIELD OF THE INVENTION

Embodiments of the present invention relate, in general, to light-emitting diodes (LEDs), and more specifically to sending and control systems and methods related thereto.

BACKGROUND

An increasing number of light fixtures are utilizing light-emitting diodes (LEDs) as light sources to increase efficiency and provide a longer operational lifetime over conventional incandescent light sources. While designers using incandescent light sources have had decades to work out problems, LEDs are relatively new and still present some issues that need to be resolved before gaining wide acceptance. Their support circuitry, for example, must be compatible with as many types of existing lighting systems as possible. For example, incandescent bulbs may be connected directly to an AC mains voltage, halogen-light systems may use magnetic or electronic transformers to provide 12 or 24 VAC to a halogen bulb, and other light sources may be powered by a DC current or voltage. Furthermore, AC mains voltages may vary country-by-country (60 Hz in the United States, for example, and 50 Hz in Europe).

Another issue involves the reaction of LEDs to heat. LEDs require a relatively low constant temperature in comparison to incandescent light sources or bulbs. A typical operating temperature of an incandescent filament is over 2,000 degrees Celsius. An LED may have a maximum operating temperature of approximately 150 degrees Celsius, and operation above this maximum can cause a decrease in the operational lifetime of the LED. The decrease in light output is caused at least in part by carrier recombination processes at higher temperatures and a decrease in the effective optical bandgap of the LED at these temperatures. A typical operating temperature of an LED is usually below about 100 degrees Celsius to preserve operational lifetime while maintaining acceptable light output.

Multiple LEDs are typically grouped together in each light fixture to provide the amount of light output necessary for lighting a room in a home or building. LEDs used in light fixtures are typically considerably higher in light output and power consumption than the typical colored indicator LED seen in many electronic devices. This increase in the LED density and power causes an increase in heat buildup in the fixture. In LEDs, an increase in temperature causes an increase in current which, consequently, causes a further increase in temperature. If left unchecked, the increased current caused by increased temperature can cause thermal runaway where the temperature increases to a point where the LED is damaged. Therefore, it is important to control the power supplied to the LEDs to ensure that the temperature of the LEDs does not exceed the maximum safe operating temperature. Controlling the power to the LED can generally be accomplished by controlling the current or controlling the voltage, although light output is directly related to current.

Incandescent and fluorescent lighting fixtures in buildings are usually supplied by a line or mains voltage, such as 115 Volts AC at 60 Hertz in the United States. Other single phase voltages are also used, such as 277 Volts AC, and in some instances other single and multiple phase voltages are used as well as other frequencies, such as in Britain where 220 Volts at 50 Hz is common. Power to these lighting fixtures is controlled by a wall mounted switch for an on or off operation, and a dimmer switch can be used to control brightness levels in addition to providing a simple on and off function.

LEDs in light fixtures operate on a much lower voltage than what is typically supplied to a building. LEDs require low voltage DC so supply power must be converted from higher voltage AC to DC constant current. Generally a single white LED will require a forward voltage of less than approximately 3.5 Volts. It is also important to control current to the LED since excessive current can destroy the LED and changes in current can lead to undesirable changes in light output.

Some conventional LED lighting systems use thermocouples or thermistors to measure temperatures of the LEDs. These devices are placed in a position near the LED and are connected to a temperature monitoring system using set of wires that are in addition to the wires powering the LED. These temperature detection devices cannot directly measure the actual temperature of the LED die itself since they necessarily have to be spaced apart from the LED die because of optics of the LEDs and the LED conductors. In addition, the extra set of wires between the thermistor and the monitoring system can be inconvenient, especially if the monitoring system is a significant distance from the thermistor. Because the thermistors do not directly measure the actual temperature of the LED die, these devices introduce some particular inaccuracies into the temperature measurement.

Current LED light sources are compatible with only a subset of the various types of lighting system configurations and, even when they are compatible, they may not provide a user experience similar to that of a traditional bulb. For example, an LED replacement bulb may not respond to a dimmer control in a manner similar to the response of a traditional bulb. One of the difficulties in designing, in particular, halogen-replacement LED light sources is compatibility with the two kinds of transformers (i.e., magnetic and electronic) that may have been originally used to power a halogen bulb. A magnetic transformer consists of a pair of coupled inductors that step an input voltage up or down based on the number of windings of each inductor, while an electronic transformer is a complex electrical circuit that produces a high-frequency (i.e., 100 kHz or greater) AC voltage that approximates the low-frequency (60 Hz) output of a magnetic transformer. FIG. 17 is a graph 1700 of an output 1702 of an electronic transformer; the envelope 1704 of the output 1702 approximates a low-frequency signal, such as one produced by a magnetic transformer. FIG. 18 is a graph 1800 of another type of output 1802 produced by an electronic transformer. In this example, the output 1802 does not maintain consistent polarity relative to a virtual ground 1804 within a half 60 Hz period 1806. Thus, magnetic and electronic transformers behave differently, and a circuit designed to work with one may not work with the other.

For example, while magnetic transformers produce a regular AC waveform for any level of load, electronic transformers have a minimum load requirement under which a portion of their pulse-train output is either intermittent or entirely cut off. The graph 1900 shown in FIG. 19 illustrates the output of an electronic transformer for a light load 1902 and for no load 1904. In each case, portions 1906 of the outputs are clipped—these portions 1906 are herein referred to as under-load dead time ("ULDT"). LED modules may draw less power than permitted by transformers designed for halogen bulbs and, without further modification, may cause the transformer to operate in the ULDT regions 1906.

To avoid this problem, some LED light sources use a "bleeder" circuit that draws additional power from the halogen-light transformer so that it does not engage in the ULDT behavior. With a bleeder, any clipping can be assumed to be caused by the dimmer, not by the ULDT. Because the bleeder circuit does not produce light, however, it merely wastes power, and may not be compatible with a low-power application. Indeed, LED light sources are preferred over conventional lights in part for their smaller power requirement, and the use of a bleeder circuit runs contrary to this advantage. In addition, if the LED light source is also to be used with a magnetic transformer, the bleeder circuit is no longer necessary yet still consumes power.

Dimmer circuits are another area of incompatibility between magnetic and electronic transformers. Dimmer circuits typically operate by a method known as phase dimming, in which a portion of a dimmer-input waveform is cut off to produce a clipped version of the waveform. The graph 2000 shown in FIG. 20 illustrates a result 2002 of dimming an output of a magnetic transformer by cutting off a leading-edge point 2004 and a result 2006 dimming an output of an electronic transformer by cutting off a trailing-edge point 2008. The duration (i.e., duty cycle) of the clipping corresponds to the level of dimming desired—more clipping produces a dimmer light. Accordingly, unlike the dimmer circuit for an incandescent light, where the clipped input waveform directly supplies power to the lamp (with the degree of clipping determining the amount of power supplied and, hence, the lamp's brightness), in an LED system the received input waveform may be used to power a regulated supply that, in turn, powers the LED. Thus, the input waveform may be analyzed to infer the dimmer setting and, based thereon, the output of the regulated LED power supply is adjusted to provide the intended dimming level.

One implementation of a magnetic-transformer dimmer circuit measures the amount of time the input waveform is at or near the zero crossing 2010 and produces a control signal that is a proportional function of this time. The control signal, in turn, adjusts the power provided to the LED. Because the output of a magnetic transformer (such as the output 2002) is at or near a zero crossing 2010 only at the beginning or end of a half-cycle, this type of dimmer circuit produces the intended result. The output of electronic transformers (such as the output 2006), however, approaches zero many times during the non-clipped portion of the waveform due to its high-frequency pulse-train behavior. Zero-crossing detection schemes, therefore, must filter out these short-duration zero crossings while still be sensitive enough to react to small changes in the duration of the intended dimming level.

Because electronic transformers typically employ a ULDT-prevention circuit (e.g., a bleeder circuit), however, a simple zero-crossing-based dimming-detection method is not workable. If a dimmer circuit clips parts of the input waveform, the LED module reacts by reducing the power to the LEDs. In response, the electronic transformer reacts to the lighter load by clipping even more of the AC waveform, and the LED module interprets that as a request for further dimming and reduces LED power even more. The ULDT of the transformer then clips even more, and this cycle repeats until the light turns off entirely.

The use of a dimmer with an electronic transformer may cause yet another problem due to the ULDT behavior of the transformer. In one situation, the dimmer is adjusted to reduce the brightness of the LED light. The constant-current driver, in response, decreases the current drawn by the LED light, thereby decreasing the load of the transformer. As the load decreases below a certain required minimum value, the transformer engages in the ULDT behavior, decreasing the power supplied to the LED source. In response, the LED driver decreases the brightness of the light again, causing the transformer's load to decrease further; that causes the transformer to decrease its power output even more. This cycle eventually results in completely turning off the LED light.

Furthermore, electronic transformers are designed to power a resistive load, such as a halogen bulb, in a manner roughly equivalent to a magnetic transformer. LED light sources, however, present smaller, nonlinear loads to an electronic transformer and may lead to very different behavior. The brightness of a halogen bulb is roughly proportional to its input power; the nonlinear nature of LEDs, however, means that their brightness may not be proportional to their input power. Generally, LED light sources require constant-current drivers to provide a linear response. When a dimmer designed for a halogen bulb is used with an electronic transformer to power an LED source, therefore, the response may not be the linear, gradual response expected, but rather a nonlinear and/or abrupt brightening or darkening.

In addition, existing analog methods for thermal management of an LED involve to either a linear response or the response characteristics of a thermistor. While an analog thermal-management circuit may be configured to never exceed manufacturing limits, the linear/thermistor response is not likely to produce an ideal response (e.g., the LED may not always be as bright as it could otherwise be). Furthermore, prior-art techniques for merging thermal and dimming level parameters perform summation or multiplication; a drawback of these approaches is that an end user could dim a hot lamp but, as the lamp cools in response to the dimming, the thermal limit of the lamp increases and the summation or multiplication of the dimming level and the thermal limit results in the light growing brighter than the desired level.

Therefore, there is a need for a power-efficient, supply-agnostic LED light source capable of replacing different types of existing bulbs, regardless of the type of transformer and/or dimmer used to power and/or control the existing bulb.

SUMMARY

A thermal-management circuit determines a current thermal operating point of an LED. By referencing stored thermal operating range data specific to that type or category of LED, the circuit is able to adjust power to the LED accordingly. The stored thermal operating range data is more accurate than, for example, data estimated via use of a thermistor, so the circuit is able to run the LED brighter than it otherwise could be.

In one example, a thermal-management circuit for an LED is provided. The circuit has a temperature sensor, a power supply, a current sensor, and a processing device. The temperature sensor is configured to sense a first thermal operating point and generate a temperature signal indicative of the first thermal operating point. The power supply is configured to provide a forward drive current to power the LED, the forward drive current having a first LED operating current component and a first thermistor current component. The current sensor is configured to detect the first LED operating current component. The processing device is configured to (a) receive the temperature signal from the temperature sensor; (b) receive a signal indicative of the first LED operating current component; (c) determine a thermal operating range of the LED; (d) responsive to receiving the temperature signal from the temperature sensor, receiving the signal indicative of the first LED operating current component, and determining the thermal operating range of the LED, determine the first thermal operating point of the LED is outside the thermal operating range of the LED; and (e) generate a first control setting configured to adjust the first LED operating current component to a second LED operating current component, and to cause the LED to be driven at a second thermal operating point, the second thermal operating point within the thermal operating range.

In another example, a method of thermal management for an LED is provided. The method includes (a) providing a forward drive current to power the LED, the forward drive current having a first LED operating current component and a first thermistor current component; (b) detecting the first LED operating current component; (c) sensing a first thermal operating point of the LED; and (d) generating a temperature signal indicative of the first thermal operating point. The method also includes (e) determining a thermal operating range of the LED; (f) determining that the first thermal operating point of the LED is outside the thermal operating range of the LED; and (g) generating a first control setting configured to cause the LED to be driven at a second operating point, the second thermal operating point within the thermal operating range.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 6 is a diagrammatic illustration, in elevation, of a control system having a switch for controlling a light emitting diode mounted in a light fixture in a room;

FIG. 17 is a graph of an output of an electronic transformer;

FIG. 18 is a graph of another output of an electronic transformer;

FIG. 19 is a graph of an output of an electronic transformer under different load conditions; and FIG. 20 is a graph of a result of dimming the outputs of transformers.

DETAILED DESCRIPTION

Figure 1:
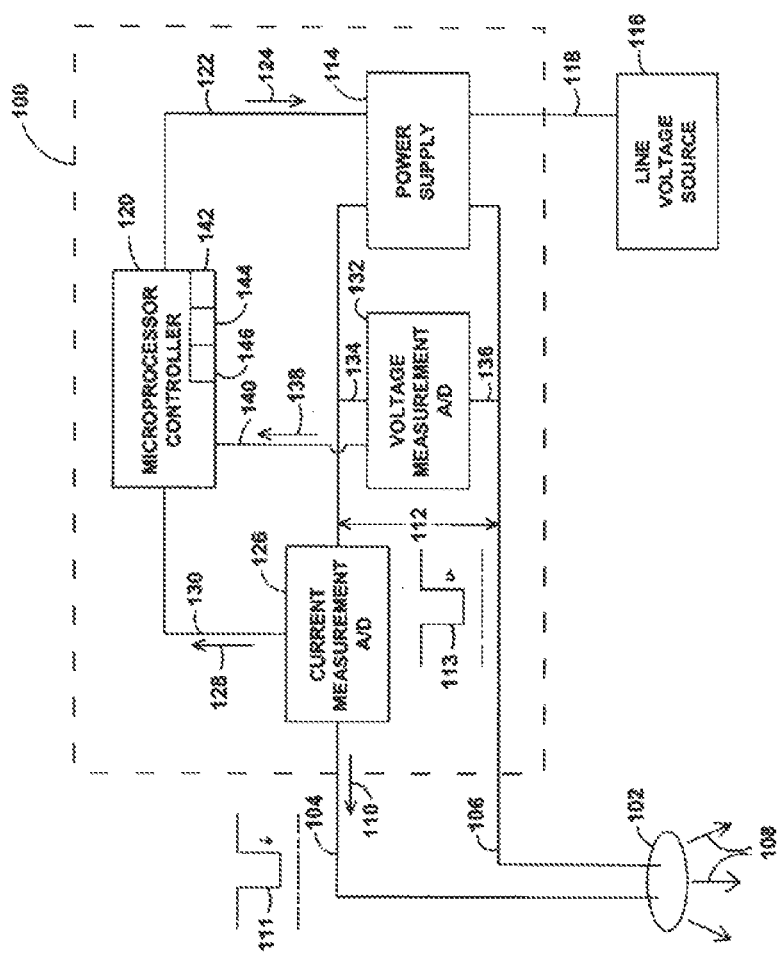
FIG. 1 is a block diagram of a control system for determining a temperature of a light emitting diode.

While this invention is susceptible to embodiment in many different forms, there are shown in the drawings, and will be described herein in detail, specific embodiments thereof with the understanding that the present disclosure is to be considered as an exemplification of the principles of the invention and is not to be limited to the specific embodiments described. Descriptive terminology such as, for example, uppermost/lowermost, right/left, front/rear and the like has been adopted for purposes of enhancing the reader's understanding, with respect to the various views provided in the figures, and is in no way intended as been limiting.

Referring to the drawings, wherein like components may be indicated by like reference numbers throughout the various figures, FIG. 1 illustrates one embodiment of a light emitting diode (LED) control system, indicated by the reference number 100 within a dashed line. Control system 100 is electrically connected to an LED 102 using a first LED conductor 104 and a second LED conductor 106. LED 102 is operable to produce light, represented by arrows 108, when the LED receives an operating current 110 through the LED conductors in a range of operating currents and receives an operating voltage 112 in a range of operating voltages across the LED conductors. In the present embodiment, control system 100 includes a power supply 114 which is connected to a line power source 116 through line conductors 118. The utility power source provides an AC line voltage at a typical line voltage, such as 110 Volts RMS, to power supply 114. Power supply 114 converts the utility power to the operating voltage in the range of operating voltages and applies the operating voltage to the LED conductors. Power supply 114 also converts the utility power to operating current 110 in the range of operating currents and applies the operating current to the LED conductors.

A separate transformer (not shown in FIG. 1) can be used for transforming the line power from the line voltage source to a transformed power. In this instance, the power supply receives the transformed power from the transformer and produces the operating current and operating voltage as discussed.

Power supply 114 can be controlled by a controller 120 through a control line 122. Controller 120 provides a current control signal 124 which controls the amount or magnitude of the operating current applied to the LED conductors. The amount of light produced by the LED is directly related to the amount of operating current that the LED receives. Therefore, by controlling the operating current, the controller can control the amount of light produced by the LED. Controller 120 can be connected to a current measurement analog to digital (A/D) converter 126 or other current sensor which detects the magnitude of the operating current and produces a current sensed signal 128 that is supplied to the controller through a current sensed signal line 130. Using the current sensed signal, the controller can determine the present level of the operating current and can change current control signal 124 to adjust the magnitude of the operating current. As an alternative or in addition to sensing the current with the current sensor, the current can be determined by producing the current at a known magnitude.

A voltage measurement A/D converter 132 or other voltage sensor is connected between the first and second LED conductors using voltage sensor conductors 134 and 136. Converter 132 detects the voltage across the LED conductors and produces a voltage sensed signal 138 on a voltage sensed signal line 140. The voltage sensed signal line is connected to controller 120, which receives the voltage sensed signal 138 and can determine the operating voltage that is supplied to LED 102. It should be noted that while LED 102 is presently discussed as a single LED, many of the concepts and embodiments are applicable to multiple LED's as well. Specific examples of multiple LED systems will also be discussed below.

Controller 120 can include a processor 142, a clock 144 and a memory 146 along with software, not specifically shown, which enables the controller to determine the operating current and the operating voltage based on the current sensed signal 128 and the voltage sensed signal 138, respectively. The software can be configured to operate the controller as required in view of the overall disclosure. Controller 120 can also store values of the operating current and voltage in the memory along with the times at which the stored values occurred, among other things.

Current flowing through the LED causes the LED to produce heat as well as light. The LED is operable at an operating temperature which is at a safe level if it remains below a maximum temperature. If the temperature exceeds the maximum temperature then the LED can be subject to thermal damage which can reduce the lifetime of the LED or cause rapid failure of the LED. In some instances, the heat causes an internal resistance of the LED to decrease which, in turn, increases the amount of current that flows through the LED which increases the heat produced. Left unchecked, the LED enters a condition of thermal runaway where the heat caused by the increased current which is caused by the heat eventually causes the temperature of the LED to exceed the maximum temperature and the LED fails.

Figure 2:
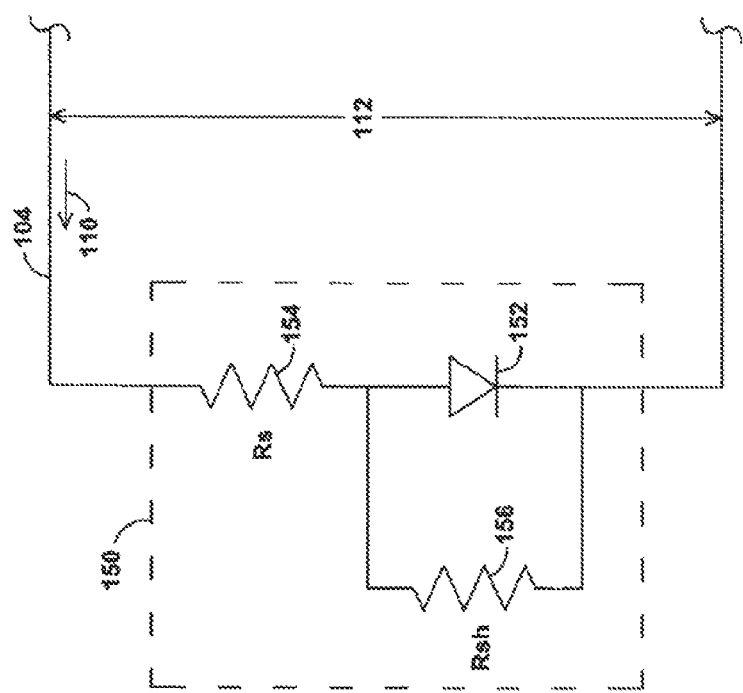
FIG. 2 is an equivalent circuit diagram of a light emitting diode used for determining the temperature of the light emitting diode.

In the present embodiment, control system 100 can determine the temperature of the LED based on electrical measurements through the two LED conductors. This allows the control system to set the operating current to prevent the LED from overheating as well as allowing for the determination of the operating lifetime of the LED, among other things. Turning now to FIG. 2, a diode equivalent circuit 150 is shown connected to first LED conductor 104 and second LED conductor 106. In general, LED 102 can be represented by the diode equivalent circuit which includes a diode junction 152, a series resistance 154 and a shunt resistance 156. Using the diode equivalent circuit, operating current 104 can be determined by the following ideal diode equation:

$$I = I_0 \exp\left[\frac{V - Eg}{AkT}\right]$$

Where I is the operating current flowing through the LED, $I_0$ is a constant depending on the LED properties, V is a voltage applied across the diode junction of the LED, $E_g$ is a value that is closely related to the optical band gap of the semiconductor at the diode junction referred to as the "effective" optical band gap, A is a constant known as the diode factor which is usually a value between 1 and 2, k is Boltzmann's constant and T is the temperature of the semiconductor diode junction in degrees Kelvin.

At relatively lower voltages, below about 1.5 to 2 volts, shunt resistance 156 of the equivalent circuit appears to dominate and the current-voltage-temperature behavior deviates from what is predicted by Equation 1. However, at these lower voltages the LED remains cool and produces little useful light. At relatively higher voltages, above about 2.5 volts, series resistance 154 appears to dominate and the current-voltage-temperature behavior deviates from Equation 1. These higher voltages are near the limit of LED operation.

The effective shunt resistance is a result of surface and junction imperfections while the series resistance results from sheet resistance of the semiconductor doped layers, contact resistance and the wires. In reverse bias, the effective shunt resistance is extremely high as the junction depletion width increases. This insulating layer allows for essentially no current flow through the reverse biased LED. In order to avoid the accumulation of destructive levels of electrostatic charge, a Zener diode (not shown) is usually placed across the diode to drain off current at voltages above about 5 volts.

Equation 1 describes the current, voltage and temperature operation of the LED to an acceptable level of accuracy within a range of operating voltages where the operating voltage is above where the shunt resistance dominates and below where the series resistance dominates. In one embodiment, this range is from about 1.5 V to about 2.5 V, however this range may be larger or smaller depending on characteristics of the LED. By knowing the values, other than T in Equation 1, the temperature of the actual diode die itself can be determined.

One of the values needed to determine the temperature is the effective optical band gap value, $E_g$. The effective optical band gap is nearly the same for all white LED's since most LED's use blue light to produce the white light, even when different semiconductor materials are used. In many white LED's, the blue or UV light is used to excite phosphor to produce white light in the white LED's. Applicant has empirically demonstrated with several commercial LED's that the effective optical band gap is 3.2 eV. The diode factor A is taken to be 2, which is usually a good assumption for LED's for diodes where junction recombination dominates. The effective band gap can also be determined for the LED by solving Equation 1 for $E_g$ if all of the other variables in Equation 1 are known.

Another value that can be determined is the series resistance 154. Given the limitations of series and shunt resistances, it can be important to measure the current voltage relationship in the proper range of values. By determining the series resistance the temperature can be determined below where the series resistance dominates and where an acceptable level of accuracy can be obtained. At high current the voltage applied to the LED drops across the diode as well as the series resistance. The actual diode voltage can be devolved from the total operating voltage 112 from the equivalent circuit shown in FIG. 2. The operating voltage, V at a measured current I is divided across the two circuit elements Rs and the diode 152 as follows in Equation 2 where Rs is the series resistance and Vd is the voltage across the diode.

$$V = IRs + Vd$$

Because the series resistance Rs is a constant and does not vary, the exponential dependence of the diodes I-V relationship can be separated from the linear relationship of the series resistance by performing measurements at several different currents and voltages and solving for the diode's variables. Equation 2 can be solved for the diode voltage Vd=V−IRs which can then be substituted into Equation 1 to give the following Equation 3 for determining the series resistance.

$$I = I_0 \exp\left[\frac{(V - IRs) - Eg}{AkT}\right]$$

Figure 3:
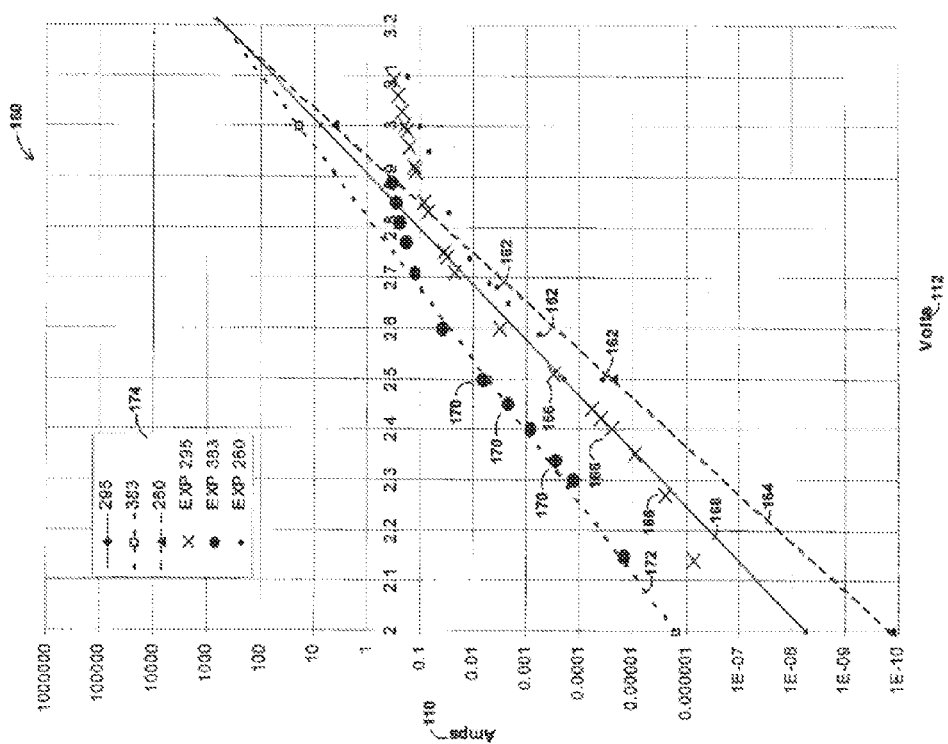
FIG. 3 is a graph of experimental and theoretical results for temperatures determined.

A comparison of experimental data with results obtained using Equation 1 is shown in a graph 160 in FIG. 3. Graph 160 shows a plot of a log of operating current 110 plotted against operating voltage 112 at three different experimental temperatures; 260 degrees Kelvin, 295 degrees Kelvin and 383 degrees Kelvin (hereinafter K). A value of $5 \times 10^2$ Amps was used in Equation 1 for $I_0$ to make the calculated data fit the experimental data. The experimental data was obtained by immersing the LED in a temperature controlled mineral oil bath while the data was taken. A thermocouple was welded to a metal slug of the LED to measure the temperature of the LED and oil bath and the operating current and operating voltage were measured.

The experimental results for the log current vs. voltage points at 260 K are shown by small circular dots, some of which are indicated by the reference number 162, the temperature curve of theoretical results obtained using Equation 1 for the temperature of 260 K are represented by dashed line 164. Data points for the experimental results of the current vs. voltage at 295 K are shown as X's, some of which are indicated by the reference number 166. Solid line 168 is a temperature curve that shows the theoretical results obtained using Equation 1 with the 295 K temperature. The experimental results for current vs. voltage at 383 K are shown by circular dots, some of which are indicated by the reference number 170. A temperature curve of the theoretical results obtained using Equation 1 at 383 K are shown by dashed line 172. Key 174 also shows which information is experimental and which was obtained using Equation 1 for subsequently generating the three linear plots.

As shown in graph 160, at relatively higher currents and voltages the experimental current vs. voltage points deviate from those predicted by Equation 1. While not intending to be bound by theory, this may be at least partially due to the series resistance of the LED and may indicative of wasted power in the form of heat. It is likely that low temperature measurements are affected by self-heating of the LEDs. A reasonably accurate determination of temperature can be obtained by the theoretical results by using current and voltage that correspond to areas of the temperature curve where there is sufficient agreement between experimental and theoretical results.

As seen in graph 160, as the temperature is increased, the temperature curve moves to the left and the slope of the curve decreases. Therefore by determining a point on the graph of current and voltage of an LED, the temperature of the LED can be determined based on where the point falls on the graph. Also, by determining more than one point based on more than one current and voltage, the slope of the temperature curve can be determined which can then establish the temperature for the multiple points. Further, by using Equation 1, a given current and voltage can be used to determine a single temperature of the LED at a given time.

Control system 100 (FIG. 1) can determine the temperature of LED 102 through the two wire connection to the LED using the first and second LED conductors 104 and 106. Operating current 110 can be provided by power supply 114 at a known amplitude. Operating voltage 112 can be determined by voltage measurement A/D converter 132. Given this information along with Equation 1 as discussed above, controller 120 can determine the operating temperature of LED 102 based on current flow and voltage across the LED conductors. This allows the temperature of the LED to be determined from a location that is remote from the LED without the need for additional wires to connect to the LED. This also provides an accurate determination of the actual temperature of the LED die itself, not the temperature of the atmosphere around the LED as provided by a thermal detection device that is located in the thermal pathway of the LED.

In one embodiment, controller 120 controls power supply 114 to produce a pulse 111 of current that is superimposed on operating current 110 through the LED conductors. This current pulse can be produced at a known magnitude or the current can be accurately measured with current measurement A/D converter 126. Current pulse 111 is shown in the present example as a negative pulse which lowers the operating current while still keeping the operating current positive, but other pulse shapes can also be used. The current pulse causes voltage 112 to react with a corresponding voltage pulse 113 which can be measured using the voltage measurement A/D converter 132. Voltage pulse 113 is a temporary reduction in operating voltage that still maintains the forward bias across the LED. Controller 120 then uses the amplitudes of the current and voltage pulses to determine the temperature of the LED using Equation 1. A voltage pulse can be used in place of the current pulse. In this instance, the voltage pulse would be applied to the LED conductors at an amplitude that is either known or sensed and the resulting current pulse can be measured using the current measurement A/D converter. It should be understood that measurements of current or voltage pulses can be accomplished in a number of different ways in view of the recognitions that have been brought to light herein. In one embodiment, an average temperature of groups of LEDs that are arranged in series or parallel can be determined based on one or more current pulses through the LEDs.

The current pulse can be an increase or a decrease in the operating current, and the current pulse can also be in the shape of a ramp, triangle wave or other shape that provides more than one current. In the case where the current pulse includes a shape such as the ramp, the current pulse will provide more than one different current amplitude which, in response, will cause the voltage to exhibit more than one different voltage amplitude. These multiple corresponding currents and voltages can then be used to determine the temperature either based on points on a graph, such as graph 160, or based on a slope of a temperature curve. In one example, the current pulse can be used to put the corresponding sensed voltage in a voltage range, described above, between where the series resistance of the LED and the shunt resistance of the LED dominate. Multiple different pulses can also be used and the pulses can be produced at regular intervals, or based on the temperature determined or on other parameters. In some instances, power supplies can provide anomalies such as ripples in the current which can be used as the current pulse. Switching type power supplies are one example of these types of devices.

In one embodiment, the current pulse can be sufficiently short in duration such that any change in light output by the LED caused by the pulse is not perceivable by humans. This avoids any perceived flickering of the light level that would not be desirable in a lighting system that is used at least partially for illumination for human perception. High persistence phosphors can be used so that a longer pulse duration can be used. The longer pulse can improve the accuracy of the temperature determination by allowing for the use of a more accurate A/D converter which uses a longer sampling time and can average out random noises and other interference.

By determining the temperature of the LED, control system 100 can control the operating current to the LED so that the LED temperature is maintained at a safe operating temperature below which heat damage to the LED can occur. Controller 120 can be programmed with the maximum safe operating temperature of the LED and can compare the determined temperature with the safe operating temperature. The controller can raise or lower the operating current until the LED operates at a desired operating temperature. The controller can also provide other control functions.

The control system can also record the determined temperatures to a file in the memory along with the time of the temperature. In this way, the control system can keep a running tally of the operating temperature of the LED and time of operation of the LED to project the lifetime of the LED. The memory can be non-volatile memory so that the system can remember the temperature of the LED in the event of a brief power failure. When power is restored, this allows the control system to resume operation of the LED by setting the operating current based at least partially on the stored operating temperature. Operating current and/or operating voltage or other parameters can also be stored into memory for tracking other information regarding the LED. For instance, by tracking operating current, operating voltage and time, the control system can monitor power consumption of the LED. Overall operating time of the LED can be tracked by monitoring the time that operating current and/or operating voltage are applied to the LED.

Figure 4:
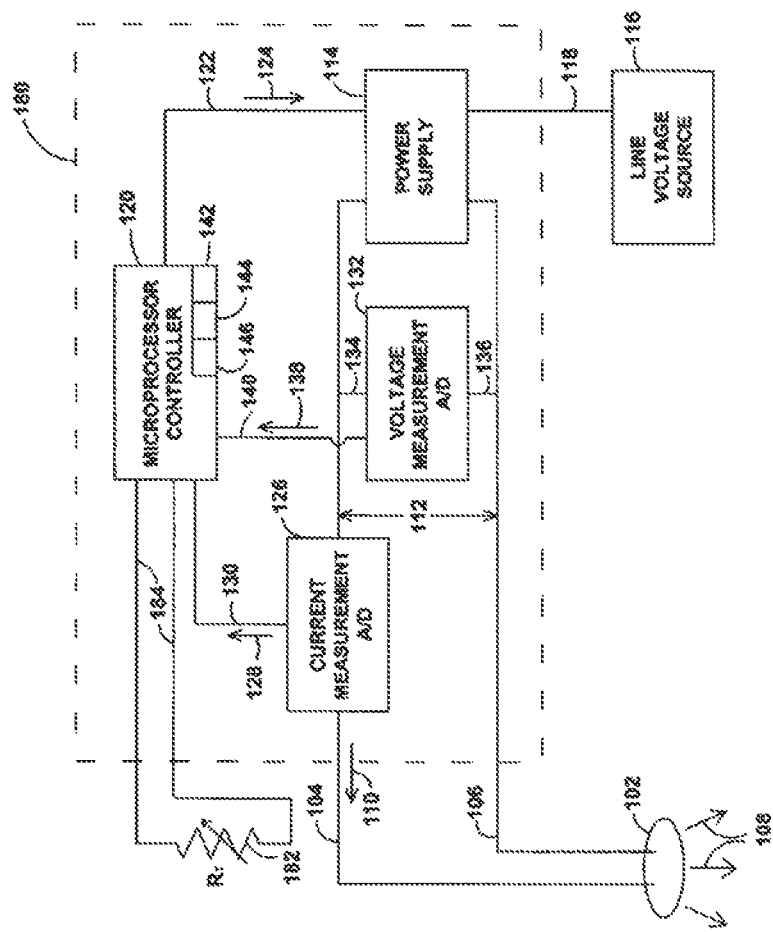
FIG. 4 is a block diagram of a circuit for determining an ambient temperature.

Yet another embodiment is illustrated in FIG. 4, where a control system 180 includes a connection with a thermistor 182. Thermistor 182 is electrically connected to controller 120 with thermistor conductors 184 so that the controller can determine a thermistor temperature at the location of the thermistor by determining a resistance of the thermistor. In the embodiment shown in FIG. 4, thermistor 182 is located remote from LED 102 but is in the same thermal environment as the LED. By being in the same environment, thermistor 182 and LED 102 are essentially at the same temperature prior to operation of the LED at startup or after the LED has had sufficient time to cool to the ambient temperature after operation. In this way, thermistor 182 can be used to determine a temperature of the LED. This operation could be conducted after the LED and control system are installed where they are to be used, or could be conducted during a manufacturing process prior to installation. Thermistor 182 can also be mounted near the LED and/or within the same enclosure as LED 102, such as within a light fixture. In this case, the thermistor conductors would reach from the controller to the location of the thermistor near the LED. Also, this allows the control system to be in a different thermal environment from the LED and thermistor.

Figure 5A:
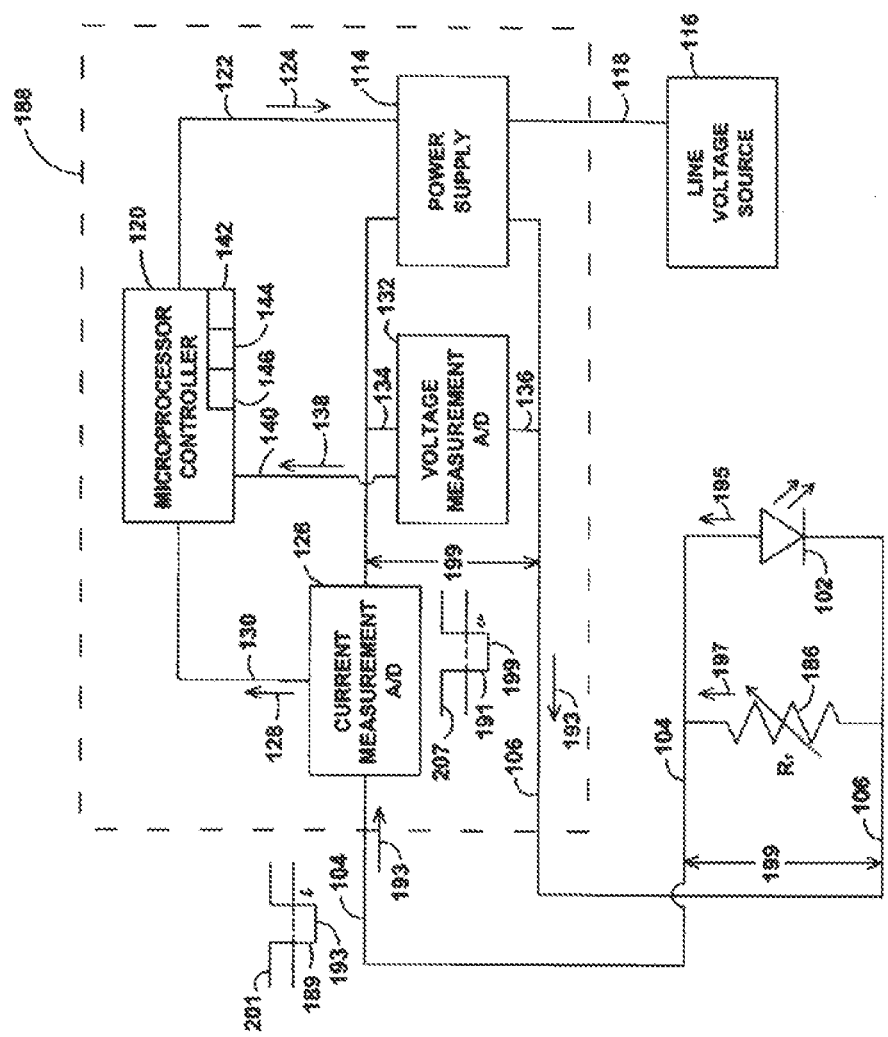
FIG. 5a is a block diagram of a circuit for determining an ambient temperature using conductors for powering the light emitting diode.
Figure 5B:
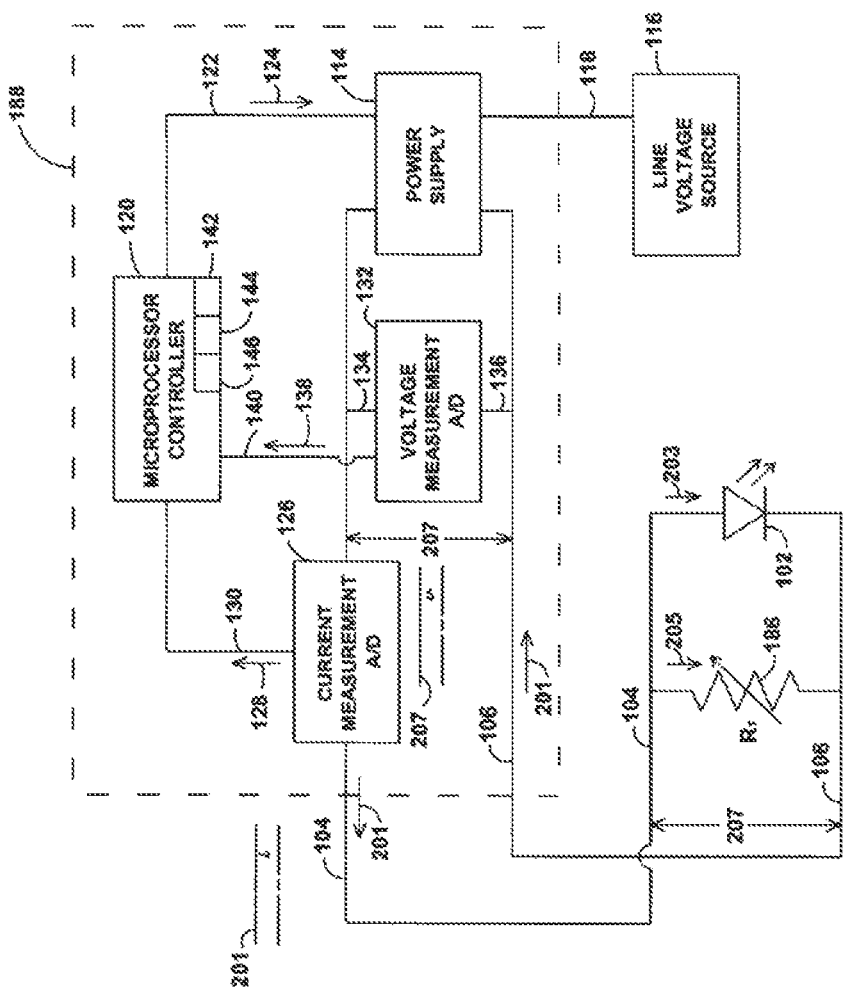
FIG. 5b is another block diagram of the circuit for determining an ambient temperature using conductors for powering the light emitting diode.

In another embodiment, shown in FIGS. 5a and 5b, a thermistor 186 is electrically connected in parallel with LED 102 and is positioned in a thermal pathway to receive heat from the LED. Thermistor 186 is chosen to have an effective resistance range that is lower than an effective resistance of the LED when reverse biased. At a reverse bias voltage, up to about −5 Volts, the reverse bias resistance of the LED is extremely high. The thermistor can also be chosen to have a forward voltage bias resistance that is much higher than an effective forward voltage resistance of the LED. As shown in FIG. 5a, a control system 188 can apply a current pulse 189 to the LED conductors such that a reverse bias voltage pulse 191 is created and a reverse bias voltage 199 is seen across the LED. The current pulse 189 causes a reverse drive current 193 in the LED conductors. One portion of the reverse drive current flows through the LED as a leakage current 195 which does not cause the LED to produce light. Another portion of the reverse drive current flows through the thermistor as a reverse thermistor current 197.

By selecting the resistance range of the thermistor to be small enough in comparison to the reverse bias resistance of the LED, the leakage current flow through the LED is insignificant compared with the reverse thermistor current flow through the thermistor and therefore the leakage current can be ignored while still gaining a reasonably accurate temperature measurement from the thermistor. When determined at startup or when the LED is at ambient temperature, the temperature of the thermistor is the same as the LED temperature. Connecting the thermistor in parallel with the LED allows the thermistor to be positioned with the LED and away from the control system while maintaining the advantage of only using the two LED conductors for powering the LED and for temperature determination.

Operation of the LED to produce light is shown in FIG. 5b where a forward drive current 201 is applied to the LED conductors. Forward drive current 201 includes one portion which flows through the LED and is referred to as the forward operating current 203 and another portion that flows through the thermistor which is referred to as a forward thermistor current 205. The forward drive current produces a forward operating voltage 207 across the LED.

By determining an ambient temperature of the LED, applying a current pulse to the LED, determining a magnitude of the current pulse and the resulting magnitude of voltage pulse, the controller has three variables; current, voltage and temperature, that can be used in Equation 1. Using the values determined for these variables, and supplying known or estimated values for other parameters, the controller can solve Equation 1 for any one of the remaining parameters. For instance, knowing the operating current, operating voltage, temperature, $I_0$ and the diode factor A, the controller can calculate the effective band gap $E_g$. By knowing the other variables, the diode factor can be calculated. The thermistor temperature can also be used in a calibration procedure to increase the accuracy in later determining the temperature using the operating current and operating voltage. The thermistor can be included in the diode package along with the LED die and in some cases a zener diode.

As can be understood by the present disclosure, the control system of the several embodiments disclosed can be located remotely from the LED or within the same enclosure as the LED, such as within a light fixture. One or more components of the control system can also be arrange on one or more integrated circuits which can be included in a single LED package along with the LED die.

One embodiment in which the control system is located remotely from the LEDs is shown in FIG. 6. In this embodiment, the control system is included in a switch assembly 190 that is installed at a fixed location in a wall 192. Switch assembly 190 includes a switch 191 for controlling the application of power to LED 102 through LED conductors 104 and 106. LED 102 can be installed in a lighting fixture 194 that can be mounted in a fixed position in a ceiling 196 within a room 198 with wall 192 and switch assembly 190. The switch can be a line voltage switch in which case the line voltage is controlled by the switch before it is passed to the control system. In the embodiment shown in FIG. 6, the line voltage is connected to a control system 200 using line conductors 118. Switch 191 is connected using switch conductors 204 to controller 120 within the control system to control power to the LEDs through the control system. Switch assembly 190 can have an on/off function and/or dimming capabilities through control by the controller. A display 206 can be included and connected to the controller with a display conductor 202 to indicate the status of the switch and/or the LED to a user. The display can be one or more colored indicators or can be a screen type display.

Switch assembly 190 can be configured to fit within and connect to a conventional single-gang electrical box 210 such as those typically used for mounting a conventional single-pole line voltage switch in a wall.

Figure 7:
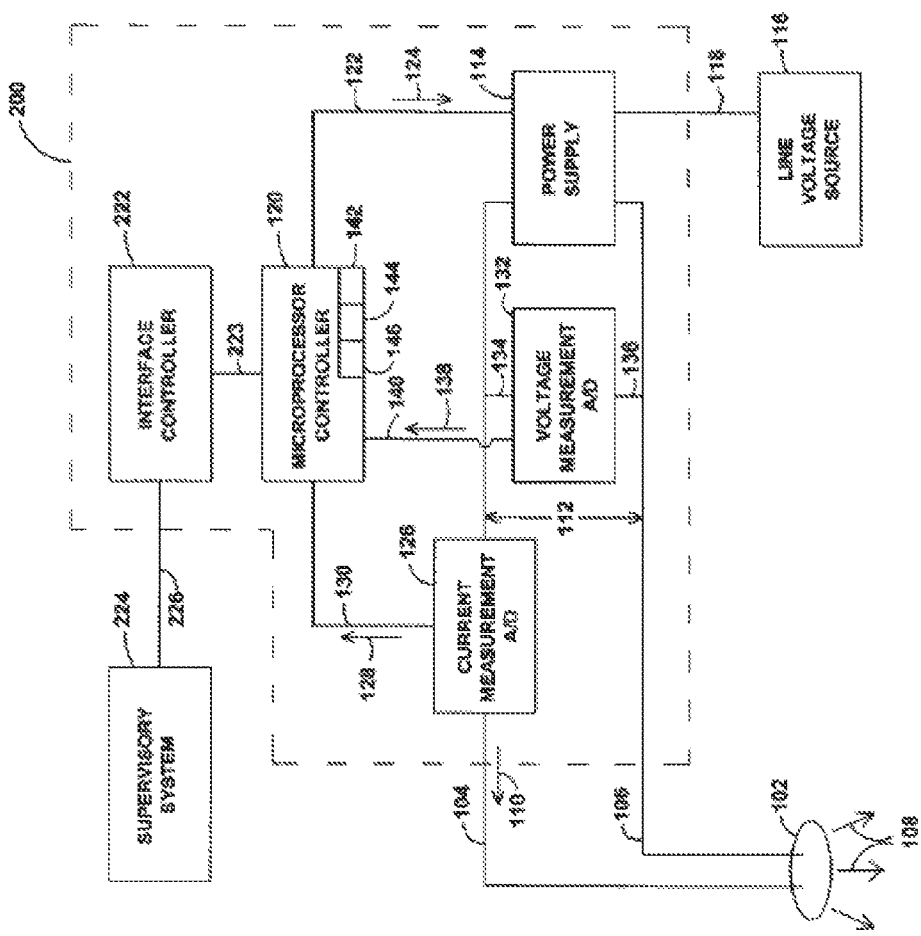
FIG. 7 is a block diagram of a control system having an interface for transferring data to a supervisory system.

Another embodiment of the control system is shown in FIG. 7. Control system 220 includes an interface 222 for transferring data gathered by the control system to a supervisor system 224. Data can be transferred from controller 120 to interface 222 over an interface conductor 223. The supervisor system can be a system that is used for building control and/or monitoring and can receive data gathered by multiple control systems controlling multiple LEDs at different locations. Information regarding power usage, temperature, operable lifetime of the LED and other useful information based on time, temperature, current and/or voltage can be transmitted between control system 220 and supervisor system 224. Control system 220 and/or supervisor system 224 can include displays for notifying users of the status of the LED. The supervisor system can provide control instructions to the control system to cause it to control light output. The interface can connect to the supervisor system using a cable 226 such as an Ethernet cable, over the line conductors 118 or can use wireless communications such as a ZigBee™ or other type of wired or wireless communication to a building information system.

Figure 8:
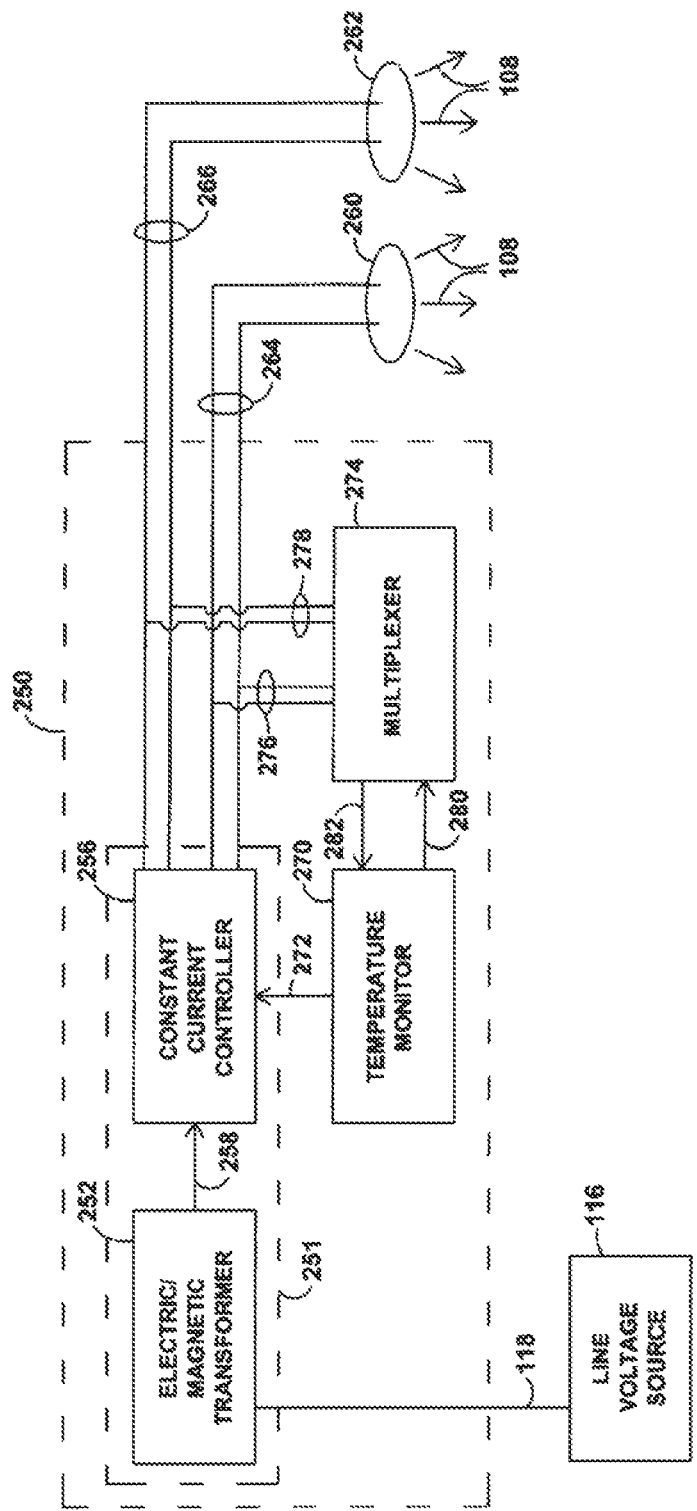
FIG. 8 is a block diagram of a control system for determining a temperature of more than one light emitting diode.

Another embodiment is shown in FIG. 8 in which a control system 250 is arranged for monitor and control of multiple LEDs. Control system 250 includes a power supply 251 with a transformer 252 that is connected to receive line power from line power source 116 through line power conductors 118. Transformer 252 transforms the line voltage, which is 115 Volts AC in the present case, to 12 Volts AC. Line voltage is typically over 100V AC, for the present embodiment. Power supply 251 also includes a current controller 256. The transformer is connected to current controller 256 using a power supply conductor 258 to supply the 12 Volt power to the current controller. Power supply 251 is configured to use the 12 Volts AC to supply an operating current and operating voltage to multiple LEDs. For illustrative purposes in the present embodiment, the current controller is connected to two different LEDs, LED 260 and LED 262. LEDs 260 and 262 can be separate LEDs in one fixture, can be separate LEDs in separate fixtures or each LED 260 and 262 can each represent multiple LEDs that are connected together and/or with other LEDs within a similar thermal environment in a series, parallel or series-parallel circuit arrangement. LED 260 is connected to current controller 256 using LED conductors 264 and LED 262 is connected to current controller 256 using LED conductors 266. Current controller 256 powers LEDs 260 and 262 through the respective LED conductors.

Control system 250 also includes a temperature monitor 270 that is connected to the current controller using a control line 272. Temperature monitor 270 includes a processor as well as current and voltage A/D converters that are not specifically shown in this example. Temperature monitor 270 sends control signals over control line 272 to the current controller to set the operating current to each of the LEDs. Based on the known operating characteristics and limitations of the LEDs, a processor of the temperature monitor can regulate the operating current to the LEDs via controlling the DC current or pulsed DC current. That control may make use of user preferences to maintain constant light output and/or to maintain long life. Temperature monitor 270 can also control the current controller to produce current pulses for measurement purposes over each of the LED conductors.

A multiplexer 274 is connected to LED conductors 264 and 266 using multiplexer conductor lines 276 and 278, respectively. Multiplexer 274 is connected to the temperature monitor using a control line 280 and a signal line 282. Temperature monitor 270 controls the multiplexer through the control line to selectively receive signals from one or the other of LED conductors 264 or 266 through multiplexer conductor lines 276 or 278. The multiplexer then passes the selected signals to the temperature monitor through signal line 282. The temperature monitor then determines the current and voltage on the selected LED conductor and calculates the corresponding temperature of the LED connected to the selected LED conductor. Temperature monitor 270 can then control the current controller to adjust the operating current of the selected LED based on the temperature. This process can then be repeated for the LED that was not previously selected. In this way, each of the LEDs in the system can be monitored for temperature, current, voltage and power usage so long as they have a separate electrical connection to control system 250.

Control system 250 can be included in a switch assembly with a switch, as previously discussed, and the switch assembly can be arranged for installation in a wall of a room to control LEDs supplying light to the room. Control system 250 can also include an interface for communicating with a supervisory system as previously discussed. Using control system 250 with a supervisory system allows the supervisory system to monitor and/or control multiple LEDs on an individual basis.

Figure 9:
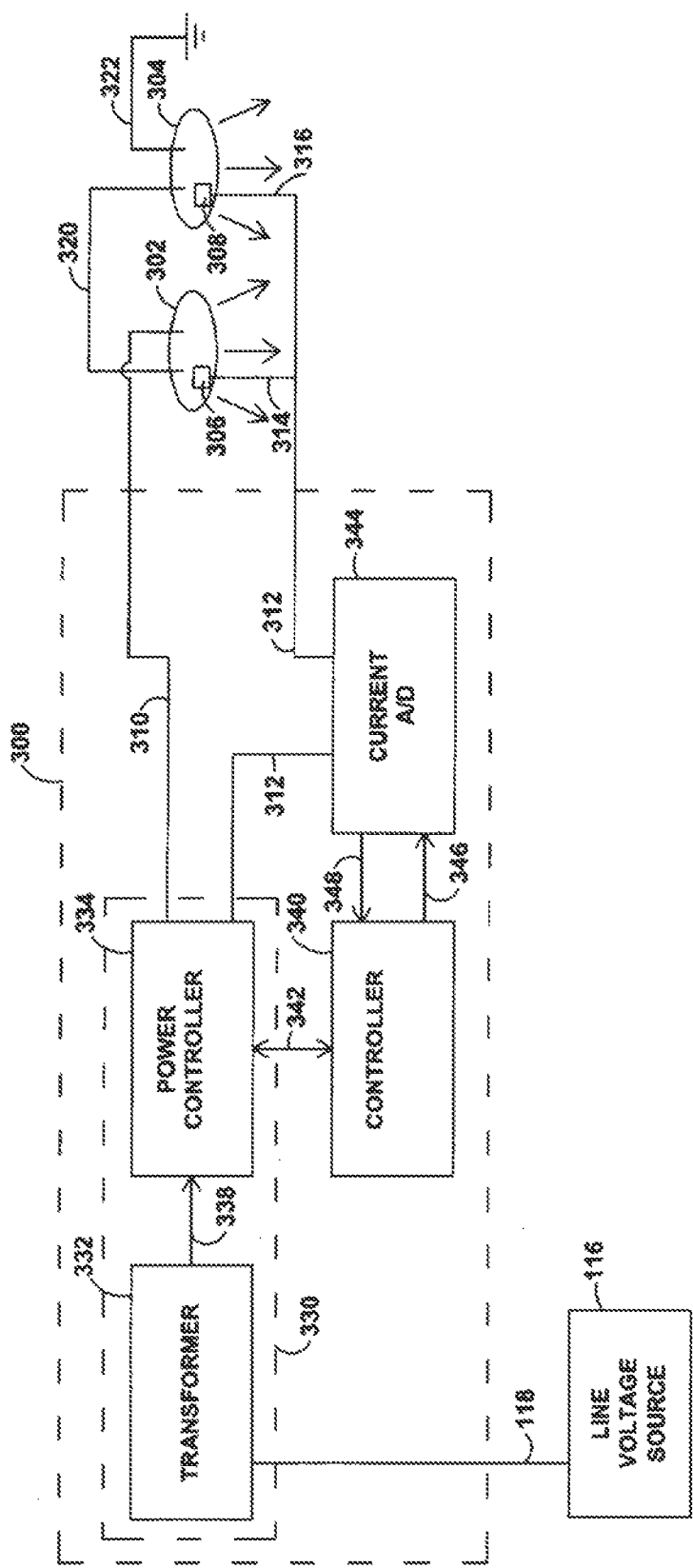
FIG. 9 is another block diagram of a control system for determining a temperature of more than one light emitting diode.

Another multiple LED arrangement is shown in FIG. 9 wherein a control system 300 is connected to two LEDs 302 and 304 that are electrically connected in series. The number of LEDs shown in FIG. 9 is exemplary of a system with multiple LEDs. The LEDs connect to the control system using LED conductors 310 and 312. LEDs 302 and 304 each include an integral heat sink 306 and 308, respectively, that are electrically connected to the LED die. The heat sinks are electrically connected to an LED conductor 312 using conductors 314 and 316. LED 302 is connected to LED conductor 310 using a first power terminal and an LED conductor 320 connects a second power terminal of LED 302 to a first power terminal of LED 304. A second power terminal of LED 304 is connected to an earth ground using a ground conductor 322.

Control system 300 includes a power supply 330 having a transformer 332 and a power controller 334. Transformer 332 receives line power from power source 116 through line power conductors 118 and transforms the line power from a higher voltage to a lower voltage which is transferred to the power controller through a power supply conductor 338. Transformer 332 can be electronic or electro-magnetic. Control system 300 also includes a temperature monitor 340 which can have a microprocessor controller. Temperature monitor 340 is connected to the power controller using a control line 342 to pass control signals between the temperature monitor and the power controller. Power controller 334 supplies power to the LEDs at an operating voltage and at an operating current controlled by the temperature monitor. A current A/D converter 344 is connected to the temperature monitor using a control line 346 and a signal line 348. In this arrangement, each LED effectively has three terminals. Pulses from power controller 334 can be sensed at each LED using current A/D converter 344 through the conductors 314 and 316 as the pulse passes through each LED. Control system 300 can also include a control switch and can be arranged to fit within the volume envelope of a typical single-gang junction box.

Each of the LEDs or groups of LEDs can also include an electronic module with electronics that respond to an analog or digital signal command. The signal commands can originate from a controller in a wall switch, or other location. Each LED module can respond to such commands individually back to the controller via the conductors 314 or 316 by producing a pulse which the controller can detect through current A/D 344. The electronic module can also be arranged to periodically produce a pulse that is unique for each LED or group of LEDs. The electronic module can also be configured to divert all or a portion of the current flowing through conductor 310 to the conductors 314 or 316 and on to the current A/D. The controller can record the current-voltage characteristics and determine a temperature for the LED connected to the module. The controller can then send a signal to have the module adjust current in the LED as required.

Each of the LEDs or groups of LEDs can also have a passive or active filter tuned to a different frequency. In this instance, the filter can be used to address the LED individually. The pulse can include a frequency component which allows the pulse to be received by a selected individual or group of LEDs to allow the temperature of the selected LED to be determined.

The control system described herein can be used as a ballast for LED lighting fixtures and much of the control system can be made in a single IC. The control system allows the determination of the actual temperature of an LED, not an estimated temperature based on a temperature near the LED. The control system can operate using only the two wires normally connected to power the LED. By using centralized control and monitor of the LED temperatures cost for LED fixtures can be reduced over systems in which each fixture includes temperature monitoring and control.

Figure 10:
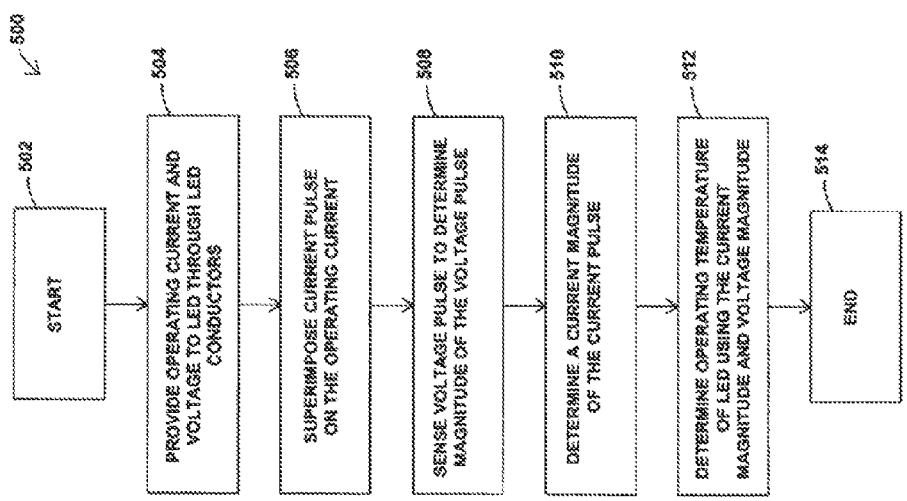
FIG. 10 is a flow diagram illustrating a method for determining a temperature of at least one light emitting diode.

A method 500 is shown in FIG. 10 for determining a temperature of at least one LED. Method 500 begins at a start 502 and then proceeds to a step 504 where an operating current and operating voltage are provided to the LED through first and second LED conductors. Following step 504, method 500 proceeds to step 506 where a current pulse is superimposed on the operating current to the LED through the first and second LED conductors. This results in a voltage pulse that is superimposed on the operating voltage. After step 506, method 500 proceeds to step 508 where the voltage pulse is sensed across the first and second LED conductors to determine a magnitude of the voltage pulse. Method 500 then proceeds to step 510 where a current magnitude of the current pulse is determined. Method 500 then proceeds to step 512 where an operating temperature of the LED is determined based on the current magnitude of the current pulse and the voltage magnitude of the voltage pulse. Method 500 then ends at step 514.

Figure 11:
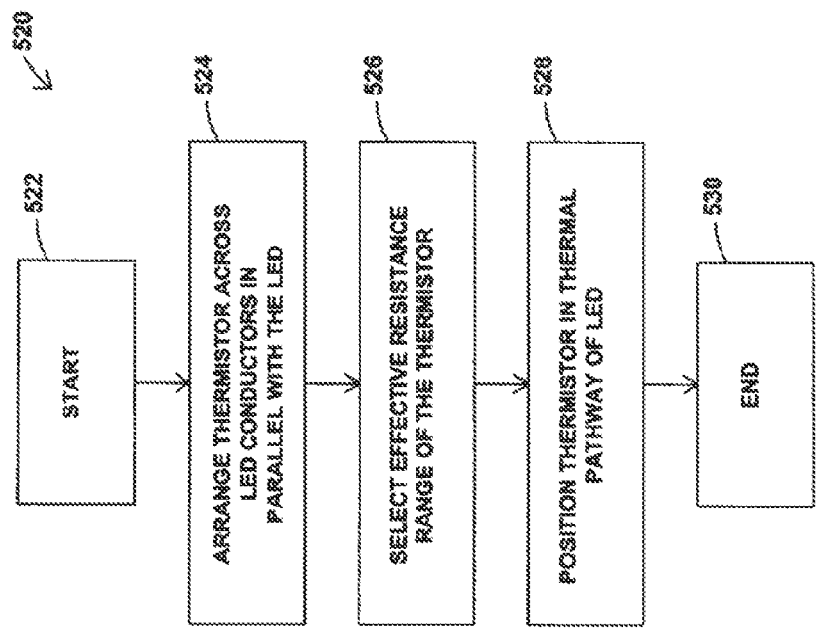
FIG. 11 is a flow diagram illustrating a method for determining a temperature near at least one light emitting diode in a circuit.

A method 520 for determining a temperature near at least one LED in a circuit is shown in FIG. 11. Method 520 begins at a start step 522 and then proceeds to a step 524 where a thermistor is arranged across the first and second LED conductors in parallel with the LED. The thermistor can have an effective resistance range in which at least two different thermistor resistances of the thermistor correspond to at least two different thermistor temperatures of the thermistor. The thermistor resistances in the effective resistance range are lower than the reverse bias voltage resistance of the LED and are higher than the forward voltage resistance of the LED. Following step 524, method 520 proceeds to step 526 where the effective resistance range is selected such that, when a forward drive current is applied to the LED conductors, one portion of the forward drive current which flows through the LED is the forward operating current and another portion of the forward drive current which flows through the thermistor is a forward thermistor current which is smaller than the forward operating current.

When the reverse bias voltage is supplied to the LED conductors, a reverse drive current flows through the LED conductors in an opposite direction than the forward drive current and one portion of the reverse drive current flows as a leakage current through the LED and which does not cause the LED to produce light and another portion of the reverse drive current flows through the thermistor as a reverse thermistor current which is larger than the leakage current. Following step 526, method 520 proceeds to step 528 where the thermistor is positioned in a thermal pathway of the LED to receive heat produced by the LED during operation of the LED. The temperature of the thermistor is measurable by determining the thermistor resistance using the reverse thermistor current and the temperature of the thermistor is related to a temperature of the LED. After step 528, method 520 proceeds to step 530 where the method ends.

Figure 12:
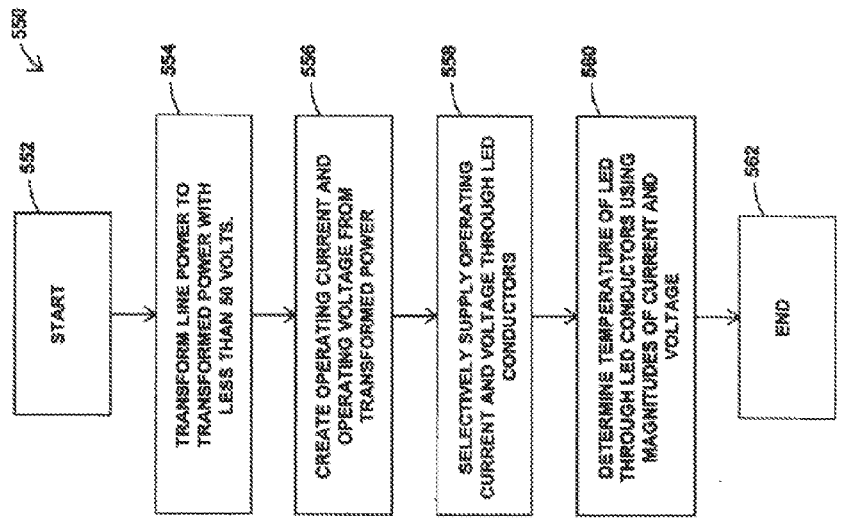
FIG. 12 is a flow diagram illustrating a method for electrically communicating with at least one LED assembly to control the LED assembly.

A method 550 for electrically communicating with at least one LED assembly to control the LED assembly is shown in FIG. 12. Method 550 begins at a start step 552 and then proceeds to a step 554 where a line power source is transformed. The line power source having a line voltage greater than 100 Volts AC and the line voltage is converted to a transformed power with a transformed voltage that is less than 50 Volts. Following step 554, method 550 proceeds to step 556 where the transformed power is received and an operating power with at least the operating current in the range of operating currents and the operating voltage in the range of operating voltages is created. After step 556, is a step 558 where the operating current and operating voltage are selectively supplied to the LED assembly through the LED conductors to control light output of the LED assembly. Following step 558 is a step 560 where a temperature of the LED is determined through the LED conductors at least partially by determining a magnitude of current through the LED conductors and determining a magnitude of voltage across the LED conductors. After step 560, method 550 ends at step 562.

Figure 13:
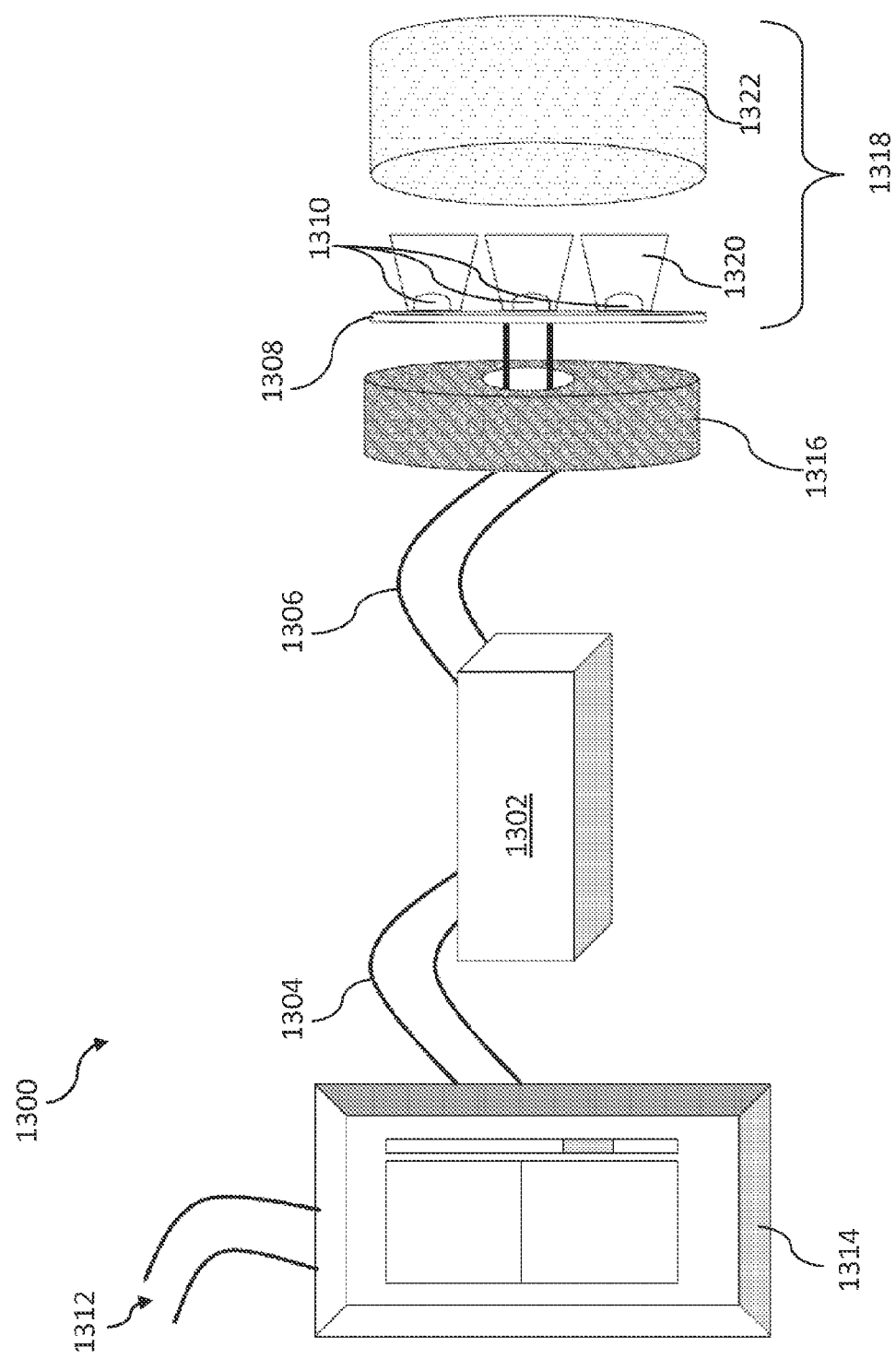
FIG. 13 is a block diagram of an LED lighting circuit in accordance with embodiments of the invention.

FIG. 13 illustrates a block diagram 1300 that includes embodiments of the present invention and other standard components, such as a transformer, dimmer switch, heat sink, and LED lenses/covers. A transformer 1302 receives a transformer input signal 1304 and provides a transformed output signal 1306. The transformer 1302 may be a magnetic transformer or an electronic transformer, and the output signal 1306 may be a low-frequency (i.e. less than or equal to approximately 120 Hz) AC signal or a high-frequency (e.g., greater than approximately 120 Hz) AC signal, respectively. The transformer 1302 may be, for example, a 5:1 or a 10:1 transformer providing a stepped-down 60 Hz output signal 1306 (or output signal envelope, if the transformer 1302 is an electronic transformer). The transformer output signal 1306 is received by circuitry contained in an LED module 1308, in accordance with embodiments of the present invention, which converts the transformer output signal 1306 into a signal suitable for powering one or more LEDs 1310, as explained in greater detail below. In accordance with embodiments of the invention, and as explained in more detail below, the LED module 1308 detects the type of the transformer 1302 and alters its behavior accordingly to provide a consistent power supply to the LEDs 1310.

In various embodiments, the transformer input signal 1304 may be an AC mains signal 1312, or it may be received from a dimmer circuit or switch 1314, such as a triac dimmer. The dimmer circuit may be, for example, a wall dimmer circuit or a lamp-mounted dimmer circuit. A conventional heat sink 1316 may be used to cool portions of the LED module 1308. The LED module 1308 and LEDs 1310 may be part of an LED assembly (also known as an LED lamp or LED "bulb") 1318, which may include aesthetic and/or functional elements such as lenses 1320 and a cover 1322.

The LED module 1308 may include a rigid member suitable for mounting the LEDs 1310, lenses 1320, and/or cover 1320. The rigid member may be (or include) a printed-circuit board, upon which one or more circuit components may be mounted. The circuit components may include passive components (e.g., capacitors, resistors, inductors, fuses, and the like), basic semiconductor components (e.g., diodes and transistors), and/or integrated-circuit chips (e.g., analog, digital, or mixed-signal chips, processors, microcontrollers, application-specific integrated circuits, field-programmable gate arrays, etc.). The circuit components included in the LED module 1308 combine to adapt the transformer output signal 1306 into a signal suitable for lighting the LEDs 1320.

Figure 14:
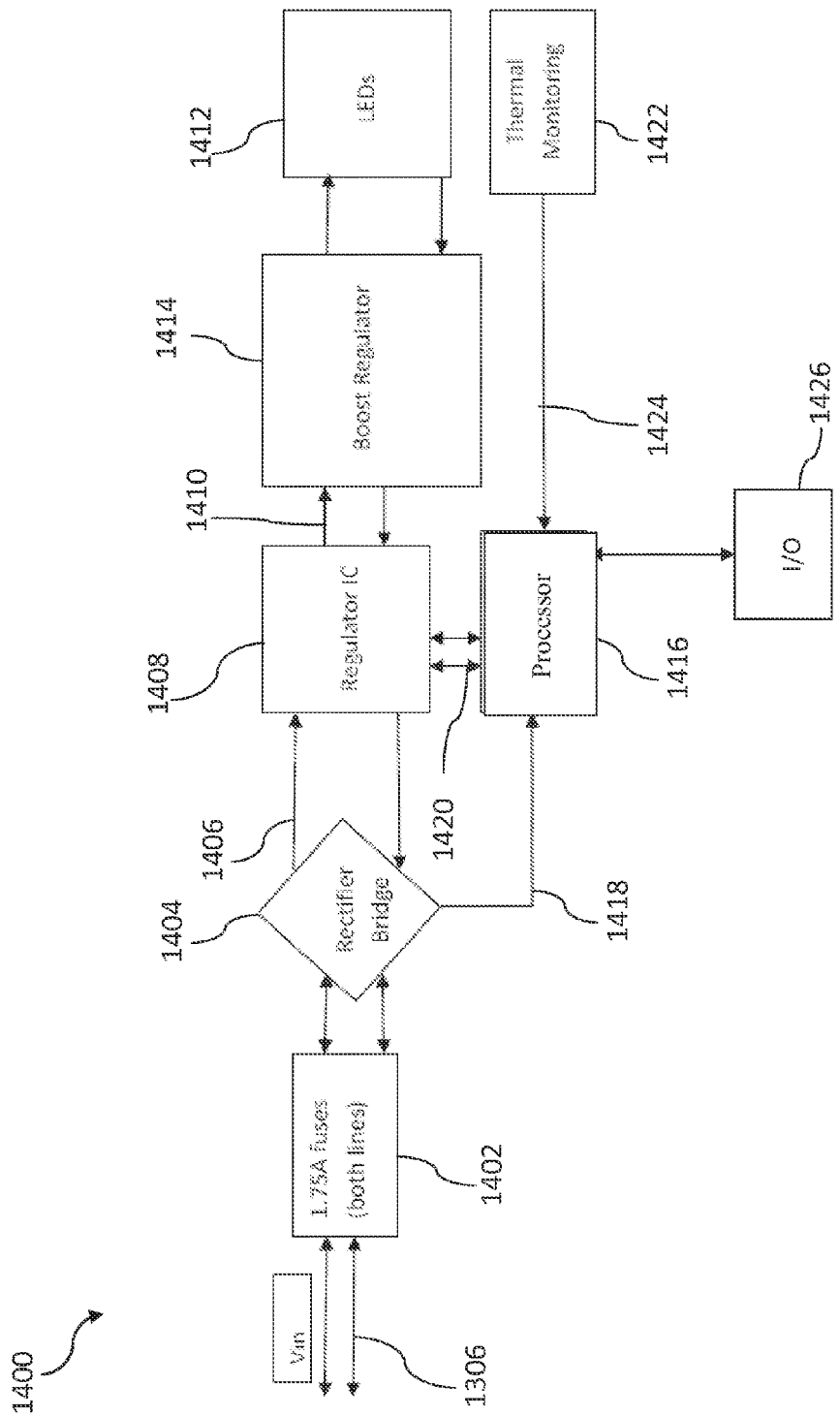
FIG. 14 is a block diagram of an LED module circuit in accordance with embodiments of the invention.

A block diagram of one such LED module circuit 1400, such as may be implemented with or integrated into the LED module 1308, is illustrated in FIG. 14. The LED module circuit 1400 includes a digital and/or analog processor 1416, in accordance with embodiments of the present invention, along with other standard components, such as a rectifier bridge 1404, regulator IC 1408, LEDs 1412, boost regulator 1414, thermal monitoring 1422, and input/output 1426. One of skill in the art will understand, however, that other LED module circuits are within the scope of the present invention and that embodiments of the invention as implemented using the processor 1416 are not limited to only the illustrated LED module circuit 1400. The transformer output signal 1306 (from, e.g., transformer 1302) is received as an input signal $V_{in}$. One or more fuses 1402 may be used to protect the circuitry of the LED module 1400 from over-voltage or over-current conditions in the input signal $V_{in}$. One fuse may be used on one polarity of the input signal $V_{in}$, or two fuses may be used (one for each polarity), as shown in the figure. In one embodiment, the fuses are 1.75-amp fuses.

Rectifier bridge 1404 may be used to rectify the input signal $V_{in}$. The rectifier bridge 1404 may be, for example, a full-wave or half-wave rectifier, and may use diodes or other one-way devices to rectify the input signal $V_{in}$. The current invention is not limited to any particular type of rectifier bridge, however, or any type of components used therein. As one of skill in the art will understand, any bridge 1404 capable of modifying the AC-like input signal $V_{in}$ in to a more DC-like output signal 1406 is compatible with the current invention.

Regulator IC or LED driver circuit 1408 may be used to receive the rectifier output 1406 and convert it into a regulated output 1410. In one embodiment, the regulated output 1410 is a constant-current signal calibrated to drive the LEDs 1412 at a current level within their tolerance limits. In other embodiments, the regulated output 1410 is a regulated voltage supply, and may be used with a ballast (e.g., a resistive, reactive, and/or electronic ballast) to limit the current through the LEDs 1412.

A DC-to-DC converter may be used to modify the regulated output 1410. In one embodiment, as shown in FIG. 14, boost regulator 1414 is used to increase the voltage or current level of the regulated output 1410. In other embodiments, a buck converter or boost-buck converter may be used. The DC-to-DC converter 1414 may be incorporated into the regulator IC 1408 or may be a separate component; in some embodiments, no DC-to-DC converter 1414 may be present at all.

Processor 1416 is used, in accordance with embodiments of the current invention, to modify the behavior of the regulator IC 1408 based at least in part on a received signal 1418 from the bridge 1404. In other embodiments, the signal 1418 is connected directly to the input voltage $V_{in}$ of the LED module 1400. The processor 1416 may be a microprocessor, microcontroller, application-specific integrated circuit, field-programmable grid array, or any other type of digital-logic or mixed-signal circuit. The processor 1416 may include dedicated analog or digital circuitry to perform some or all of the functions of the present invention, as described below, such as operational amplifiers, analog- or digital-signal comparators, analog-to-digital or digital-to-analog converters; in other embodiments, the processor 1416 includes an execution unit for executing software or firmware instructions stored in a non-transitory computer memory that perform some or all of the functions of the present invention. One of skill in the art will understand that the block diagrams and circuits described herein are not limiting and that embodiments of the present invention may be implemented in a variety of ways. A block, such as blocks 1502, 1506, 1510, 1512, 1516, 1518, and 1520 of FIG. 15, may be implemented as a standalone, dedicated circuit, for example, or combined with one or more other blocks or separated into multiple blocks as dedicated circuits. Alternatively or in addition, the block may be implemented wholly or partially as a sequence of computer instructions executed on the processor 1416. The processor 1416 may be selected to be low-cost, low-power, for its durability, and/or for its longevity. An input/output link 1420 allows the processor 1416 to send and receive control and/or data signals to and/or from the regulator IC 1408. As described in more detail below, a thermal monitoring module 1422 may be used to monitor a thermal property of one or more LEDs 1412. The processor 1416 may also be used to track the runtime of the LEDs 1412 or other components and to track a current or historical power level applied to the LEDs 1412 or other components. In one embodiment, the processor 1416 may be used to predict the lifetime of the LEDs 1412 given such inputs as runtime, power level, and estimated lifetime of the LEDs 1412. This and other information and/or commands may be accessed via an input/output port 1426, which may be a serial port, parallel port, JTAG port, network interface, or any other input/output port architecture as known in the art.

Figure 15:
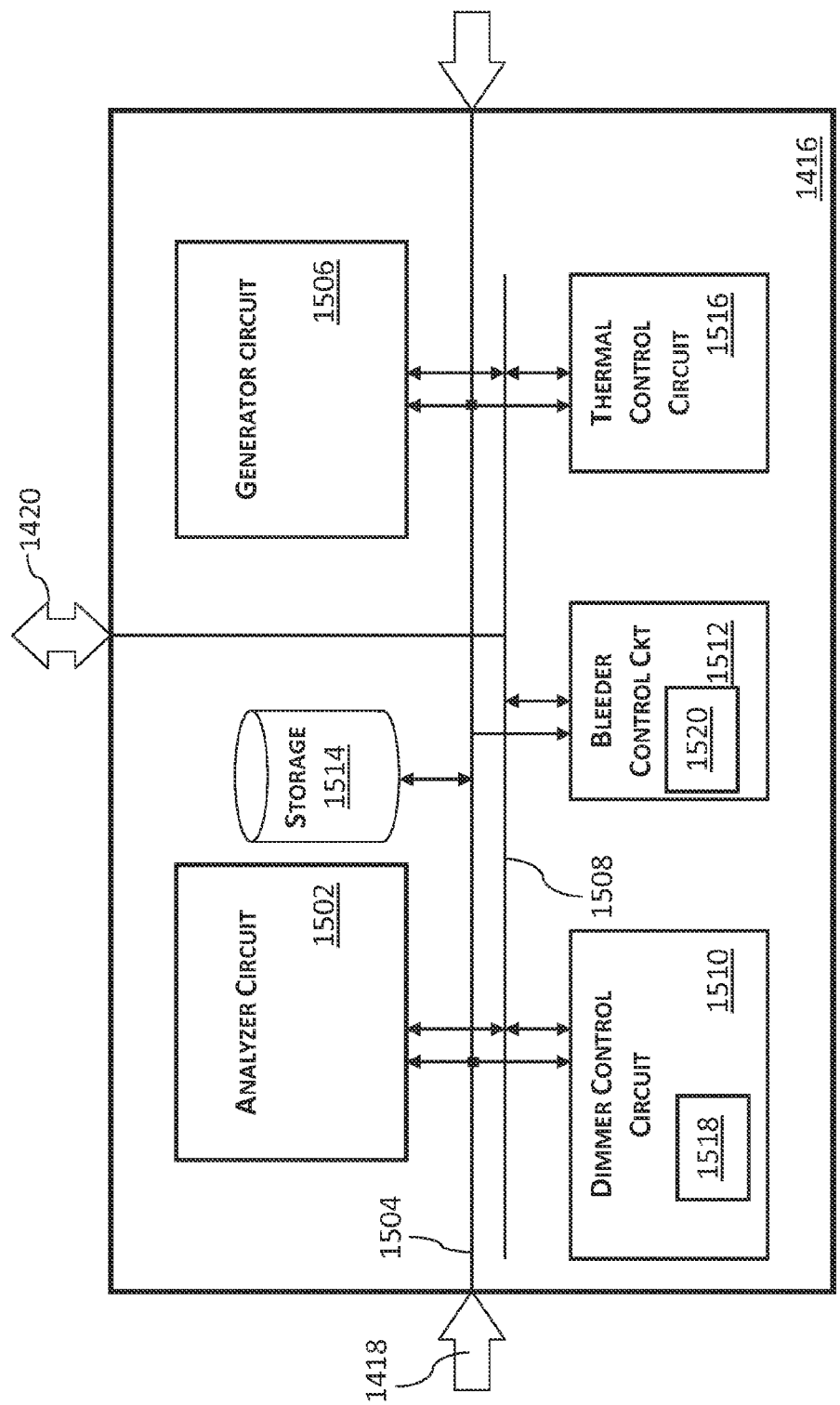
FIG. 15 is a block diagram of a processor for controlling an LED module in accordance with embodiments of the invention.

The operation of the processor 1416, in accordance with embodiments of the present invention, is described in greater detail with reference to FIG. 15. An analyzer circuit 1502 receives the signal 1418 via an input bus 1504. When the system powers on and the input signal 1418 becomes non-zero, the analyzer circuit 1502 begins analyzing the signal 1418. In one embodiment, the analyzer circuit 1502 examines one or more frequency components of the input signal 1418 by, for example, digitally sampling the input signal 1418, comparing the signal to a reference frequency with an analog mixer, or by any other method known in the art. If no significant frequency components exist (i.e., the power level of any frequency components is less than approximately 5% of a total power level of the signal), the analyzer circuit determines that the input signal 1418 is a DC signal. If one or more frequency components exist and are less than or equal to approximately 120 Hz, the analyzer determines that the input signal 1418 is derived from the output of a magnetic transformer. For example, a magnetic transformer supplied by an AC mains voltage outputs a signal having a frequency of 60 Hz; the processor 1416 receives the signal and the analyzer detects that its frequency is less than 120 Hz and concludes that the signal was generated by a magnetic transformer. If one or more frequency components of the input signal 1418 are greater than approximately 120 Hz, the analyzer circuit 1502 concludes that the signal 1418 was generated by an electronic transformer. In this case, the frequency of the signal 1418 may be significantly higher than 120 Hz (e.g., 50 or 100 kHz).

The analyzer circuit 1502 may employ any frequency detection scheme known in the art to detect the frequency of the input signal 1418. For example, the frequency detection function of the analyzer circuit 1502 may be an analog-based circuit, such as a phase-frequency detector, or it may be a digital circuit that samples the input signal 1418 and processes the sampled digital data to determine the frequency. In one embodiment, the analyzer circuit 1502 detects a load condition presented by the regulator IC 1408. For example, the analyzer circuit 102 may receive a signal representing a current operating point of the regulator IC 1408 and determine its input load; alternatively, the regulator IC 1408 may directly report its input load. In another embodiment, the analyzer circuit 1502 may send a control signal to the regulator IC 1408 requesting that it configure itself to present a particular input load. In one embodiment, the processor 1416 uses a dimming control signal, as explained further below, to vary the load.

The analyzer circuit 1502 may correlate a determined input load with the frequency detected at that load to derive further information about the transformer 1302. For example, the manufacturer and/or model of the transformer 1302, and in particular an electronic transformer, may be detected from this information. The analyzer circuit 1502 may include a storage device 1514, which may be a read-only memory, flash memory, look-up table, or any other storage device, and contain data on devices, frequencies, and loads. Addressing the storage device with the one or more load-frequency data points may result in a determination of the type of the transformer 1302. The storage device 1514 may contain discrete values or expected ranges for the data stored therein; in one embodiment, detected load and frequency information may be matched to stored values or ranges; in another embodiment, the closest matching stored values or ranges are selected.

The analyzer circuit 1502 may also determine, from the input signal 1418, different AC mains standards used in different countries or regions. For example, the United States uses AC mains having a frequency of 60 Hz, while Europe has AC mains of 50 Hz. The analyzer circuit 1502 may report this result to the generator circuit 1506, which in turn generates an appropriate control signal for the regulator IC 1408. The regulator IC 1408 may include a circuit for adjusting its behavior based on a detected country or region. Thus, the LED module circuit 1400 may be country- or region-agnostic.

The analysis carried out by the analyzer circuit 1502 make take place upon system power-up, and duration of the analysis may be less than one second (e.g., enough time to observe at least 60 cycles of standard AC mains input voltage). In other embodiments, the duration of the analysis is less than one-tenth of a second (e.g., enough time to observe at least five cycles of AC mains input voltage). This span of time is short enough to be imperceptible, or nearly imperceptible, to a user. The analysis may also be carried out at other times during the operation of the LED module; for example, when the input supply voltage or frequency changes by a given threshold, or after a given amount of time has elapsed.

Once the type of power supply/transformer is determined, a generator circuit 1506 generates a control signal in accordance with the detected type of transformer and sends the control signal to the regulator IC 1408, via an input/output bus 1508, through the input/output link 1420. The regulator IC 1408 may be capable of operating in a first mode that accepts a DC input voltage $V_{in}$, a second mode that accepts a low-frequency (≤120 Hz) input voltage $V_{in}$, and a third mode that accepts a high-frequency (>120 Hz) input voltage $V_{in}$. As one of skill in the art will understand, the regulator IC 1408 may require different rectifiers, filters, or control systems depending on the type of input and may be capable of switching modes to suit the type of input. The generator circuit 1506, based on the determination of the analyzer circuit 1502, instructs the regulator IC 1408 to enter the first, second, or third mode. Thus, the LED module 1400 is compatible with a wide variety of input voltages and transformer types.

The processor 1416 may also include a dimmer control circuit 1510, a bleeder control circuit 1512, and/or a thermal control circuit 1516. The operation of these circuits is explained in greater detail below.

The analyzer 1502 and generator 1506 may modify their control of the regulator IC 1408 based on the absence or presence of a dimmer and, if a dimmer is present, an amount of dimming. A dimmer present in the upstream circuits may be detected by observing the input voltage 1418 for, e.g., clipping, as discussed above with reference to FIG. 20. Typically, a dimmer designed to work with a magnetic transformer clips the leading edges of an input signal, and a dimmer designed to work with an electronic transformer clips the trailing edges of an input signal. The analyzer 1502 may detect leading- or trailing-edge dimming on signals output by either type of transformer, however, by first detecting the type of transformer, as described above, and examining both the leading and trailing edges of the input signal.

Once the presence and/or type of dimming have been detected, the generator 1506 and/or a dimmer control circuit 1510 generate a control signal for the regulator IC 1408 based on the detected dimming. The dimmer circuit 1510 may include a duty-cycle estimator 1518 for estimating a duty cycle of the input signal 1418. The duty-cycle estimator may include any method of duty cycle estimation known in the art; in one embodiment, the duty-cycle estimator includes a zero-crossing detector for detecting zero crossings of the input signal 1418 and deriving the duty cycle therefrom by, for example, comparing the zero-crossing time to the period. As discussed above, the input signal 1418 may include high-frequency components if it is generated by an electronic transformer; in this case, a filter may be used to remove the high-frequency zero crossings. For example, the filter may remove any consecutive crossings that occur during a time period smaller than a predetermined threshold (e.g., less than one millisecond). The filter may be an analog filter or may be implemented in digital logic in the dimmer control circuit 1510.

In one embodiment, the dimmer control circuit 1510 derives a level of intended dimming from the input voltage 1418 and translates the intended dimming level to the output control signal 1420. The amount of dimming in the output control signal 1420 may vary depending on the type of transformer used to power the LED module 1400.

For example, if a magnetic transformer 1302 is used, the amount of clipping detected in the input signal 1418 (i.e., the duty cycle of the signal) may vary from no clipping (i.e., approximately 100% duty cycle) to full clipping (i.e., approximately 0% duty cycle). An electronic transformer 1302, on the other hand, requires a minimum amount of load to avoid the under-load dead time condition discussed above, and so may not support a lower dimming range near 0% duty cycle. In addition, some dimmer circuits (e.g., a 10%-90% dimmer circuit) consume power and thus prevent downstream circuits from receiving the full power available to the dimmer.

In one embodiment, the dimmer control circuit 1510 determines a maximum setting of the upstream dimmer 1314 (i.e., a setting that causes the least amount of dimming). The maximum dimmer setting may be determined by direct measurement of the input signal 1418. For example, the signal 1418 may be observed for a period of time and the maximum dimmer setting may equal the maximum observed voltage, current, or duty cycle of the input signal 1418. In one embodiment, the input signal 1418 is continually monitored, and if it achieves a power level higher than the current maximum dimmer level, the maximum dimmer level is updated with the newly observed level of the input signal 1418.

Alternatively or in addition, the maximum setting of the upstream dimmer 1314 may be derived based on the detected type of the upstream transformer 1302. In one embodiment, magnetic and electronic transformers 1302 have similar maximum dimmer settings. In other embodiments, an electronic transformer 1302 has a lower maximum dimmer setting than a magnetic transformer 1302.

Similarly, the dimmer control circuit 1510 determines a minimum setting of the upstream dimmer 1314 (i.e., a setting that causes the most amount of dimming). Like the maximum dimmer setting, the minimum setting may be derived from the detected type of the transformer 1314 and/or may be directly observed by monitoring the input signal 1418. The analyzer circuit 1502 and/or dimmer control circuit 1510 may determine the manufacturer and model of the electronic transformer 1314, as described above, by observing a frequency of the input signal 1418 under one or more load conditions, and may base the minimum dimmer setting at least in part on the detected manufacturer and model. For example, a minimum load value for a given model of transformer may be known, and the dimmer control circuit 1510 may base the minimum dimmer setting on the minimum load value.

Once the full range of dimmer settings of the input signal 1418 is derived or detected, the available range of dimmer input values is mapped or translated into a range of control values for the regulator IC 1408. In one embodiment, the dimmer control circuit 1510 selects control values to provide a user with the greatest range of dimming settings. For example, if a 10%-90% dimmer is used, the range of values for the input signal 1418 never approaches 0% or 100%, and thus, in other dimmer control circuits, the LEDs 1412 would never be fully on or fully off. In the present invention, however, the dimmer control circuit 1510 recognizes the 90% value of the input signal 1418 as the maximum dimmer setting (i.e., 100%) and outputs a control signal to the regulator IC 1408 instructing it to power the LEDs 1412 to full brightness. Similarly, the dimmer control circuit 1510 translates the 10% minimum value of the input signal 1418 to a value producing fully-off LEDs 1412 (i.e., 0%). In other words, in general, the dimmer control circuit 1510 maps an available, non-maximum range of dimming of the input signal 1418 (in this example, 10%-90%) onto a full 0%-100% output dimming range for controlling the regulator IC 1408. One of skill in the art will understand that this translation of the range may be accomplished by a variety of circuits, such as an analog amplifier or digital-signal processor.

In one embodiment, as the upstream dimmer 1314 is adjusted to a point somewhere between its minimum and maximum values, the dimmer control circuit 1510 varies the control signal 1420 to the regulator IC 1408 proportionately. In other embodiments, the dimmer control circuit 1510 may vary the control signal 1420 linearly or logarithmically, or according to some other function dictated by the behavior of the overall circuit, as the upstream dimmer 1314 is adjusted. Thus, the dimmer control circuit 1510 may remove any inconsistencies or nonlinearities in the control of the upstream dimmer 1314. In addition, as discussed above, the dimmer control circuit 1510 may adjust the control signal 1420 to avoid flickering of the LEDs 1412 due to an under-load dead time condition. In one embodiment, the dimmer control circuit 1510 may minimize or eliminate flickering, yet still allow the dimmer 1314 to completely shut off the LEDs 1412, by transitioning the LEDs quickly from their lowest non-flickering state to an off state as the dimmer 1314 is fully engaged.

The generator circuit 1506 and/or dimmer control circuit 1510 may output any type of control signal appropriate for the regulator IC 1408. For example, the regulator IC may accept a voltage control signal, a current control signal, and/or a pulse-width modulation control signal. In one embodiment, the generator 1506 sends, over the bus 1420, a voltage, current, and/or pulse-width modulated signal that is directly mixed or used with the output signal 1410 of the regulator IC 1408. In other embodiments, the generator 1506 outputs digital or analog control signals appropriate for the type of control (e.g., current, voltage, or pulse-width modulation), and the regulator IC 1408 modifies its behavior in accordance with the control signals. The regulator IC 1408 may implement dimming by reducing a current or voltage to the LEDs 1412, within the tolerances of operation for the LEDs 1412, and/or by changing a duty cycle of the signal powering the LEDs 1412 using, for example, pulse-width modulation.

In computing and generating the control signal 1420 for the regulator IC 1408, the generator 1506 and/or dimmer control circuit 1510 may also take into account a consistent end-user experience. For example, magnetic and electronic dimming setups produce different duty cycles at the top and bottom of the dimming ranges, so a proportionate level of dimming may be computed differently for each setup. Thus, for example, if a setting of the dimmer 1314 produces 50% dimming when using a magnetic transformer 1302, that same setting produces 50% dimming when using an electronic transformer 1302.

As described above, a bleeder circuit may be used to prevent an electronic transformer from falling into an ULDT condition. But, as further described above, bleeder circuits may be inefficient when used with an electronic transformer and both inefficient and unnecessary when used with a magnetic transformer. In embodiments of the current invention, however, once the analyzer circuit 1502 has determined the type of transformer 1302 attached, a bleeder control circuit 1512 controls when and if the bleeder circuit draws power. For example, for DC supplies and/or magnetic transformers, the bleeder is not turned on and therefore does not consume power. For electronic transformers, while a bleeder may sometimes be necessary, it may not be needed to run every cycle.

The bleeder control circuit 1512 may be needed during a cycle only when the processor 1416 is trying to determine the amount of phase clipping produced by a dimmer 1314. For example, a user may change a setting on the dimmer 1314 so that the LEDs 1412 become dimmer, and as a result the electronic transformer may be at risk for entering an ULDT condition. A phase-clip estimator circuit 1520 and/or the analyzer circuit 1502 may detect some of the clipping caused by the dimmer 1314, but some of the clipping may be caused by ULDT; the phase-clip estimator 1520 and/or analyzer 1502 may not be able to initially tell one from the other. One of skill in the art will understand that the amount of clipping may be found by, for example, detecting the times of rising edges and comparing that time to the period of the signal. Thus, in one embodiment, when the analyzer 1502 detects a change in a clipping level of the input signal 1418, but before the generator 1506 makes a corresponding change in the control signal 1420, the bleeder control circuit 1512 engages the bleeder. While the bleeder is engaged, any changes in the clipping level of the input signal 1418 are a result only of action on the dimmer 1314, and the analyzer 1502 and/or dimmer control circuit 1510 react accordingly. The delay caused by engaging the bleeder may last only a few cycles of the input signal 1418, and thus the lag between changing a setting of the dimmer 1314 and detecting a corresponding change in the brightness of the LEDs 1412 is not perceived by the user.

In one embodiment, the phase-clip estimator 1520 monitors preceding cycles of the input signal 1418 and predict at what point in the cycle ULDT-based clipping would start (if no bleeder were engaged). For example, referring back to FIG. 19, ULDT-based clipping 1906 for a light load 1902 may occur only in the latter half of a cycle; during the rest of the cycle, the bleeder is engaged and drawing power, but is not required. Thus, the processor 1416 may engage the bleeder load during only those times it is needed—slightly before (e.g., approximately 100 .mu.s before) the clipping begins and shortly after (e.g., approximately 100 microseconds after) the clipping ends.

Thus, depending on the amount of ULDT-based clipping, the bleeder may draw current for only a few hundred microseconds per cycle, which corresponds to a duty cycle of less than 0.5%. In this embodiment, a bleeder designed to draw several watts incurs an average load of only a few tens of milliwatts. Therefore, selectively using the bleeder allows for highly accurate assessment of the desired dimming level with almost no power penalty.

In one embodiment, the bleeder control circuit 1512 engages the bleeder whenever the electronic transformer 1302 approaches an ULDT condition and thus prevents any distortion of the transformer output signal 1306 caused thereby. In another embodiment, the bleeder control circuit 1512 engages the bleeder circuit less frequently, thereby saving further power. In this embodiment, while the bleeder control circuit 1512 prevents premature cutoff of the electronic transformer 1302, its less-frequent engaging of the bleeder circuit allows temporary transient effects (e.g., "clicks") to appear on the output 1306 of the transformer 1302. The analyzer 1502, however, may detect and filter out these clicks by instructing the generator 1506 not to respond to them.

The processor 1416, having power control over the regulator IC 1408, may perform thermal management of the LEDs 1412. LED lifetime and lumen maintenance is linked to the temperature and power at which the LEDs 1412 are operated; proper thermal management of the LEDs 1412 may thus extend the life, and maintain the brightness, of the LEDs 1412. In one embodiment, the processor 1416 accepts an input 1424 from a temperature sensor 1422. The storage device 1514 may contain maintenance data (e.g., lumen maintenance data) for the LEDs 1412, and a thermal control circuit 1516 may receive the temperature sensor input 1424 and access maintenance data corresponding to a current thermal operating point of the LEDs 1412. The thermal control circuit 1516 may then calculate the safest operating point for the brightest LEDs 1412 and instruct the generator 1506 to increase or decrease the LED control signal accordingly.

The thermal control circuit 1516 may also be used in conjunction with the dimmer control circuit 1510. A desired dimming level may be merged with thermal management requirements, producing a single brightness-level setting. In one embodiment, the two parameters are computed independently (in the digital domain by, e.g., the thermal control circuit 1516 and/or the dimmer control circuit 1510) and only the lesser of the two is used to set the brightness level. Thus, embodiments of the current invention avoid the case in which a user dims a hot lamp—i.e., the lamp brightness is affected by both thermal limiting and by the dimmer—later to find that, as the lamp cools, the brightness level increases. In one embodiment, the thermal control circuit 1516 "normalizes" 100% brightness to the value defined by the sensed temperature and instructs the dimmer control circuit 1510 to dim from that standard.

Figure 16:
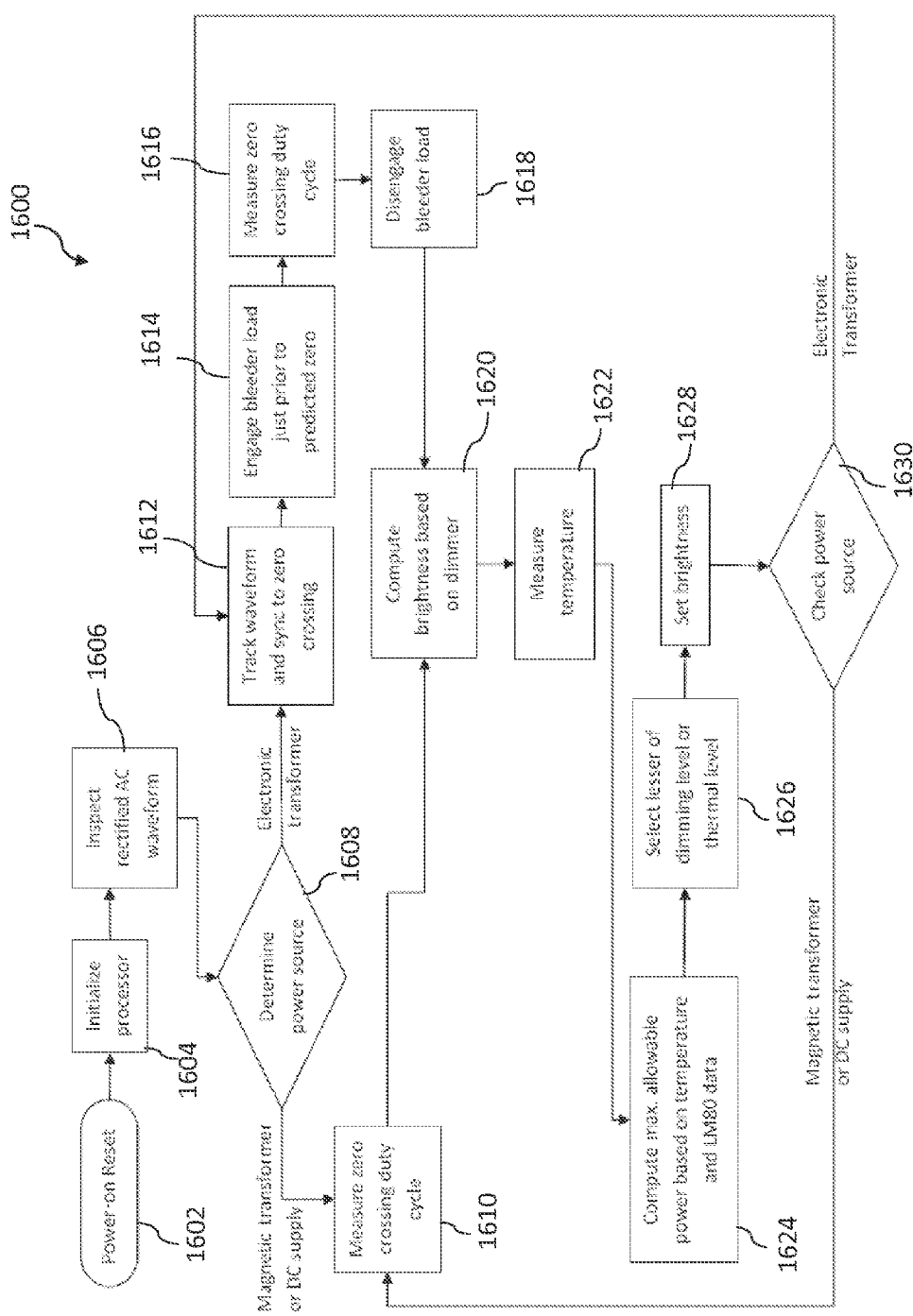
FIG. 16 is a flowchart of a method for controlling an LED module in accordance with embodiments of the invention.

Some or all of the above circuits may be used in a manner illustrated in a flowchart 1600 shown in FIG. 16. The processor 1416 is powered on (Step 1602), using its own power supply or a power supply shared with one of the other components in the LED module 1400. The processor 1416 is initialized (Step 1604) using techniques known in the art, such as by setting or resetting control registers to known values. The processor 1416 may wait to receive acknowledgement signals from other components on the LED module 1400 before leaving initialization mode.

The processor 1416 inspects the incoming rectified AC waveform 1418 (Step 1606) by observing a few cycles of it. As described above, the analyzer 1502 may detect a frequency of the input signal 1418 and determine the type of power source (Step 1608) based thereon. If the supply is a magnetic transformer, the processor 1416 measures the zero-crossing duty cycle (Step 1610) of the input waveform (i.e., the processor 1416 detects the point where the input waveform crosses zero and computes the duty cycle of the waveform based thereon). If the supply is an electronic transformer, the processor 1416 tracks the waveform 1418 and syncs to the zero crossing (Step 1612). In other words, the processor 1416 determines which zero crossings are the result of the high-frequency electronic transformer output and which zero crossings are the result of the transformer output envelop changing polarity; the processor 1416 disregards the former and tracks the latter. In one embodiment, the processor 1416 engages a bleeder load just prior to a detected zero crossing (Step 1614) in order to prevent a potential ULDT condition from influencing the duty cycle computation. The duty cycle is then measured (Step 1616) and the bleeder load is disengaged (Step 1618).

At this point, whether the power supply is a DC supply or a magnetic or electronic transformer, the processor 1416 computes a desired brightness level based on a dimmer (Step 1620), if a dimmer is present. Furthermore, if desired, a temperature of the LEDs may be measured (Step 1622). Based on the measured temperature and LED manufacturing data, the processor 1416 computes a maximum allowable power for the LED (Step 1624). The dimmer level and thermal level are analyzed to compute a net brightness level; in one embodiment, the lesser of the two is selected (Step 1626). The brightness of the LED is then set with the computed brightness level (Step 1628). Periodically, or when a change in the input signal 1418 is detected, the power supply type may be checked (Step 1630), the duty cycle of the input, dimming level, and temperature are re-measured and a new LED brightness is set.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a reflector should be understood to encompass disclosure of the act of reflecting—whether explicitly discussed or not—and, conversely, were there only disclosure of the act of reflecting, such a disclosure should be understood to encompass disclosure of a "reflector mechanism". Such changes and alternative terms are to be understood to be explicitly included in the description.

The previous description of the disclosed embodiments and examples is provided to enable any person skilled in the art to make or use the present invention as defined by the claims. Thus, the present invention is not intended to be limited to the examples disclosed herein. Various modifications to these embodiments will be readily apparent to those skilled in the art, and the generic principles defined herein may be applied to other embodiments without departing from the spirit or scope of the invention as claimed.

What is claimed is:

1. A thermal-management circuit for an LED, the circuit comprising:
   a temperature sensor configured to sense a first thermal operating point and generate a temperature signal indicative of the first thermal operating point;

a power supply configured to provide a forward drive current to power the LED, the forward drive current having a first LED operating current component;
a sensor for detecting the first LED operating current component; and
a processor configured to:
receive the temperature signal from the temperature sensor;
receive a signal indicative of the first LED operating current component;
determine a thermal operating range of the LED;
responsive to receiving the temperature signal from the temperature sensor, responsive to determining the thermal operating range of the LED, and responsive to receiving the signal indicative of the first LED operating current component, determine that the first thermal operating point of the LED is outside the thermal operating range of the LED; and
generate a first control setting configured to adjust the first LED operating current component to a second LED operating current component, and to cause the LED to be driven at a second thermal operating point, the second thermal operating point within the thermal operating range.

2. The thermal-management circuit of claim 1, wherein the second thermal operating point is selected to cause the LED to operate as brightly as possible within the thermal operating range.

3. The thermal-management circuit of claim 1, further comprising a storage device for storing the thermal operating range of the LED.

4. The thermal-management circuit of claim 3, wherein the storage device comprises a look-up table.

5. The thermal-management circuit of claim 1, further comprising a dimmer control circuit for dimming the LED in accordance with a dimmer setting; and wherein
the processor is configured to:
receive an input signal indicative of an input voltage from the dimmer control circuit;
responsive to the input signal from the dimmer control circuit, generate a second control setting configured to cause the LED to operate at a single brightness-level setting;
compare the first control setting and the second control setting; and
responsive to comparing, generate a control signal to drive the LED based on the lesser of the first control setting and the second control setting.

6. The thermal-management circuit of claim 1, further comprising a comparison circuit for selecting the least one of:
a control setting associated with the dimmer setting;
a control setting associated with the first thermal operating point; and
a control setting associated with the thermal operating range; and wherein
the processor is configured to generate a control signal based at least in part on the selection of the comparison circuit.

7. The thermal-management circuit of claim 1, wherein:
the processor is configured to receive a rectified signal from a first transformer, the rectified signal indicative of a rectified power output by the first transformer;
the circuit further comprises a regulator IC configured to receive the rectified power output from the first transformer and convert the rectified power output into a regulated power output, the rectified power output having one of a first frequency component or a second frequency component; and an input/output link coupling the processor to the regulator IC; wherein
the processor is configured to:
responsive to receiving the rectified signal from the first transformer, determine that the first transformer is one of a magnetic transformer having the first frequency component or an electronic transformer having the second frequency component, and generate a first control signal to instruct the regulator IC to operate in a mode that is compatible with the one of the magnetic transformer or the electronic transformer.

8. The thermal-management circuit of claim 1, wherein:
the processor is configured to:
receive an input signal indicative of a dimmer setting of greater than 0 percent of a full 0-100 percent range of dimming and less than 100 percent of the full 0-100 percent range of dimming;
responsive to receiving the input signal, determine the full 0-100 percent range of dimming; and
generate the first control setting, wherein the first control setting is within the full 0-100 percent range of dimming.

9. The thermal-management circuit of claim 8, further comprising:
a duty-cycle estimator for estimating a duty cycle of the input signal;
an analyzer for determining whether the input signal was produced using an electronic or a magnetic transformer;
the processor is configured to:
estimate a duty cycle of the input signal;
determine that the input signal was produced by one of an electronic transformer or a magnetic transformer; and
responsive to determining, generate a control signal to cause the circuit to operate in a mode that is compatible with the one of the magnetic transformer or the electronic transformer.

10. The thermal-management circuit of claim 1, wherein:
the processor further comprises a generator circuit and is configured to generate a first control setting configured to adjust the forward drive current down, based on a comparison of the first LED operating current component with a threshold LED operating current component at a maximum safe operating condition; whereby
the thermal-management circuit is configured to yield an LED operating lifetime of at least a predetermined value.

11. A method of performing thermal management for an LED, the method comprising:
providing a forward drive current to power the LED, the forward drive current having a first LED operating current component;
detecting the first LED operating current component;
sensing a first thermal operating point of the LED;
generating a temperature signal indicative of the first thermal operating point;
determining a thermal operating range of the LED;
determining that the first thermal operating point of the LED is outside the thermal operating range of the LED; and
generating a first control setting configured to cause the LED to be driven at a second operating point, the second thermal operating point within the thermal operating range.

12. The method of claim 11, wherein determining the thermal operating range of the LED comprises referencing a look-up table.

13. The method of claim 12, wherein the lookup table comprises LED thermal-power data.

14. The method of claim 11, further comprising:
receiving an input signal indicative of an input voltage from a dimmer control circuit;
responsive to receiving the input signal from the dimmer control circuit, generating a second control setting configured to cause the LED to operate at a single brightness-level setting;
comparing the first control setting and the second control setting; and
responsive to the comparing, generating a control signal configured to drive the LED based on the lesser of the first control setting and the second control setting.

15. The method of claim 14, further comprising:
selecting the lowest of a brightness setting associated with the dimmer setting, a brightness setting associated with the first thermal operating point, and a brightness setting associated with the thermal operating range; and wherein
generating the control signal is responsive to the selecting.

16. The method of claim 11, wherein generating the first control setting comprises generating a control setting configured to drive the LED at its maximum brightness level within the thermal operating range.

17. The method of claim 11, further comprising receiving an input signal indicative of a dimmer setting; and wherein
generating a first control setting is responsive to the receiving.

18. The method of claim 17, wherein the selecting is performed by comparing digital identifiers associated with respective ones of the brightness setting associated with the dimmer setting, the brightness setting associated with the first thermal operating point, and the brightness setting associated with the thermal operating range.

19. The method of claim 11, further comprising:
receiving an input signal indicative of a dimmer setting of greater than 0 percent of a full 0-100 percent range of dimming and less than 100 percent of the full 0-100 percent range of dimming;
responsive to receiving the input signal, determining the full 0-100 percent range of dimming; and
generating the first control setting, wherein the first control setting is within the full 0-100 percent range of dimming.

20. The method of claim 18, further comprising:
estimating a duty cycle of the input signal;
determining that the input signal was produced by one of an electronic transformer or a magnetic transformer; and
responsive to determining, generating a control signal to cause the LED to operate in a mode that is compatible with the one of the magnetic transformer or the electronic transformer.

* * * * *